United States Patent
Golan et al.

(10) Patent No.: US 12,349,712 B2
(45) Date of Patent: Jul. 8, 2025

(54) SATIETY INDUCING FOOD PRODUCTS AND PREPARATION THEREOF

(71) Applicant: SMARTBUBBLE LTD., Tel Aviv-Jaffa (IL)

(72) Inventors: Alon Golan, Tel Aviv-Jaffa (IL); Adi Etzioni, Kibbutz Tzora (IL); Oded Edelheit, Tel Aviv-Jaffa (IL)

(73) Assignee: SMARTBUBBLE LTD., Tel Aviv-Jaffa (IL)

( * ) Notice: Subject to any disclaimer, the term of this patent is extended or adjusted under 35 U.S.C. 154(b) by 909 days.

(21) Appl. No.: 17/431,399

(22) PCT Filed: Feb. 26, 2020

(86) PCT No.: PCT/IL2020/050214
§ 371 (c)(1),
(2) Date: Aug. 16, 2021

(87) PCT Pub. No.: WO2020/174469
PCT Pub. Date: Sep. 3, 2020

(65) Prior Publication Data
US 2022/0117281 A1  Apr. 21, 2022

Related U.S. Application Data

(60) Provisional application No. 62/811,690, filed on Feb. 28, 2019.

(51) Int. Cl.
| | | |
|---|---|---|
| A23L 29/256 | (2016.01) | |
| A23C 9/137 | (2006.01) | |
| A23L 2/52 | (2006.01) | |
| A23L 7/143 | (2016.01) | |
| A23L 9/10 | (2016.01) | |
| A23L 19/00 | (2016.01) | |
| A23L 33/00 | (2016.01) | |
| A23L 33/10 | (2016.01) | |
| A23P 10/30 | (2016.01) | |

(52) U.S. Cl.
CPC ............ *A23L 29/256* (2016.08); *A23C 9/137* (2013.01); *A23L 2/52* (2013.01); *A23L 7/143* (2016.08); *A23L 9/10* (2016.08); *A23L 19/09* (2016.08); *A23L 33/10* (2016.08); *A23L 33/30* (2016.08); *A23P 10/30* (2016.08); *A23V 2002/00* (2013.01)

(58) Field of Classification Search
CPC .......... A23L 29/256; A23L 2/52; A23L 7/143; A23L 9/10; A23L 19/09; A23L 33/10; A23L 33/30; A23L 33/21; A23C 9/137; A23P 10/30; A23P 30/00; A23V 2002/00
See application file for complete search history.

(56) References Cited

U.S. PATENT DOCUMENTS

| | | | |
|---|---|---|---|
| 3,717,469 A | 2/1973 | Slonimsky et al. | |
| 4,375,481 A | 3/1983 | Kuwabara et al. | |
| 9,554,590 B2 | 1/2017 | Quintens et al. | |
| 2002/0068110 A1 | 6/2002 | Liu et al. | |
| 2003/0099751 A1* | 5/2003 | Aldred ..................... | A23G 9/38 |
| | | | 426/565 |
| 2010/0316768 A1 | 12/2010 | Stillman | |

FOREIGN PATENT DOCUMENTS

| | | |
|---|---|---|
| CN | 101669545 B | 10/2012 |
| JP | 2012080806 A | 4/2012 |
| JP | 2013126401 A | 6/2013 |
| JP | 6383560 B2 | 8/2018 |
| KR | 20010100092 A | 11/2001 |
| RU | 2269272 C2 | 2/2006 |
| RU | 2539525 C2 | 1/2015 |
| RU | 2593327 C2 | 8/2016 |
| WO | 2001010235 A1 | 2/2001 |
| WO | 2015011988 A1 | 1/2015 |

OTHER PUBLICATIONS

Yin et al., A pH-responsive composite hydrogel beads based on agar and alginate for oral drug delivery, 2018, Journal of Drug Delivery Science and Technology, vol. 43, pp. 12-18. (Year: 2018).*
Yin et al. (2018) A pH-responsive composite hydrogel beads based on agar and alginate for oral drug delivery; Journal of Drug Delivery Science and Technology 43 (2018) 12-18. DOI: 10.1016/j.jddst.2017.09.009.
Beselelov, V.G. Calcium alginate. Source of soluble dietary fiber and calcium, Moscow, 2010, p. 8, 19, 20. [Retrieved Jun. 1, 2023].
Zhuravlev, R.A. Development of technology and assessment of consumer properties of sweet dishes using polysaccharides of plant origin, dissertation, Krasnodar, 2018, p. 33-35, 87, 88, 110.
Fitexpert.Biz, How to satisfy your hunger—healthy foods that give you a feeling of fullness, 2017. Available online: [https://web.archive.org/web/20210730034401/https://fitexpert.biz/chem-utolit-golod/].
Maeda et al. (2005) Effect of Agar (kanten) diet on obese patients with impaired glucose tolerance and type 2 diabetes, Diabetes, Obesity and Metabolism, 7:40-46. Retrieved Nov. 16, 2021; doi: 10.1111/j.1463-1326.2004.00370.x 40 Diabetes.
Jensen et al. (2012) Effect of Alginate Supplementation on weight loss in obese subjects completing a 12-week energy restricted diet: a randomized control trial, Am J Clin Nutr, 96(1):5-13. Retrieved Nov. 17, 2021; doi: 10.3945/ajcn.111.025312.
Lee et al (2012) Alginate: Properties and biomedical applications, Prog Polym Sci (1):106-126; Retrieved Nov. 17, 2021; doi:10.1016/j.progpolymsci.2011.06.003.

(Continued)

*Primary Examiner* — Frederick F Krass
*Assistant Examiner* — Abdulrahman Abbas
(74) *Attorney, Agent, or Firm* — The Roy Gross Law Firm, LLC; Roy D. Gross

(57) ABSTRACT

There is provided a satiety inducing food product including Agar and Alginate particles having a size range of about 0.5-30 mm, wherein the particles are configured to remain essentially intact in the stomach and in the intestine so as to occupy volume within the stomach and the intestine and thereby induce satiety.

17 Claims, 8 Drawing Sheets

(56) References Cited

OTHER PUBLICATIONS

Amin et al. (2016) Hunger and Satiety Mechanism and Their Potential Exploitation in the Regulation of Food Intake, Curr Obes Rep, 5:106-112. Retrieved Nov. 17, 2021; doi: 10.1007/s13679-015-0184-5.

Rolls et al. (1998) Volume of Food Consumed Affects Satiety in Men, Am J Clin Nutr, 67:1170-1177. Retrieved Nov. 17, 2021; doi: 10.1093/ajcn/67.6.1170.

Tamargo, A. (2019) Physical effects of dietary fibre on simulated luminal flow, studied by in vitro dynamic gastrointestinal digestion and fermentation, Food Funct., 10:3452; Retrieved Nov. 17, 2021; DOI: 10.1039/c9fo00485h.

Choi et al. (2015) Digestion Characteristics and kinetic analysis of biomolecules in a simulated human intestinal system, Intr Food Nutr Metab, 2(3):189-192. Retrieved Nov. 17, 2021; DOI: 10.15761/IFNM.1000128.

Brodkorb et al. (2019) INFOGEST static in vitro simulation of GI food digestion, Nature Protocols; Retrieved Nov. 17, 2021; https://doi.org/10.1038/s41596-018-0119-1.

Levi et al (2013) Comparative performance of milk proteins and their emulsions under dynamic in vitro adult and infant gastric digestion, Food Hydrocolloids; Retrieved Nov. 17, 2021; http://dx.doi.org/10.1016/j.foodhyd.2013.01.017.

Gaonkar et al. (2014) Microencapsulation in the food industry, A Practical Implementation Guide.

PCT International Search Report for International Application No. PCT/IL2020/050214, mailed Jun. 3, 2020, 5pp.

PCT Written Opinion for International Application No. PCT/IL2020/050214, mailed Jun. 7, 2020, 5pp.

PCT International Preliminary Report on Patentability for International Application No. PCT/IL2020/050214, issued Aug. 25, 2021, 6pp.

\* cited by examiner

SATIETY INDUCING FOOD PRODUCTS AND PREPARATION THEREOF

This application is a National Phase of PCT Patent Application No. PCT/IL2020/050214 having International filing date of Feb. 26, 2020, which claims the benefit of priority of U.S. Provisional Patent Application No. 62/811,690, filed Feb. 28, 2019, the contents of which are all incorporated herein by reference in their entirety.

TECHNICAL FIELD

The present disclosure relates generally to particles which include Agar and Alginate, methods for their preparation and uses thereof, in satiety inducing food products.

BACKGROUND

The prevalence of obesity and the number of people considered overweight in countries where a so-called Western diet is adopted is constantly increasing. According to the World Health Organization (WHO) estimates: in 2016, more than 1.9 billion adults aged 18 years and older were overweight, of these, over 650 million adults were obese, 41 million children under the age of 5 years were overweight or obese. As Further estimated by the WHO, the worldwide prevalence of obesity nearly tripled between 1975 and 2016.

Since obesity is generally known to be associated with a variety of diseases such as cardiovascular diseases, musculoskeletal disorders, diabetes and even some cancers, this increase is a major health concern for the medical world.

Mechanisms of hunger and satiety are based around the concept of the food-gut-brain axis. In essence, the food and drinks consumed interact with the gut (gastrointestinal tract) at various levels from the mouth through the lower bowel. These interactions not only provide for the digestion of food and the assimilation of nutrient into the body, but also generate feedback signals to the brain relating to physical fullness, passage of digestion and nutrients down the gut, localized and bloodstream hormone and metabolite concentrations and the digestive process itself. These signals, which may be neural (such as through the vagus nerve which innervates most of the gut) or hormonal (blood-borne peptides secreted by specialized cells within the gut) are integrated in the brain to help inform subsequent decisions about what to eat, how much, and when. Interestingly, almost all of these gut peptide hormones induce satiety, i.e. terminate meals and reduce food intake. Satiety is controlled by the properties of the food consumed—energy, density and structure. For example, we eat when we are hungry, but what makes us stop eating and the influence of the physical form of the food (whether it is solid or liquid) even if the total calorie content is the same. When food is ingested and first received by the gut, information is sent to the brain relating to the size and composition of the meal via both activation of vagal nerve cells and secretion of peptide hormones. The hormones may act locally in the gut or be released into the circulation to act on the hindbrain and other areas involved in nutrient sensing. Currently it is not known how the structure and composition of food affects satiety.

Several solutions have been proposed to help individuals to control their weight. Among these solutions is the use of appetite suppressing drugs. The use of drugs, however, is typically restricted to individuals having a medical condition that requires such treatment.

Diet pills based on more natural ingredients are also known in the art. Most of these pills contain different plant extracts or formulas of fibers from plants or alga. Exemplary herbal or natural supplements for weight loss include, for example: *Garcinia cambogia*—"VitaBalance *Garcinia cambogia* Plus", "Nutrigold *Garcinia cambogia* Gold"—tropical fruit also known as the *Malabar tamarind* (hydroxycitric acid). Other supplements include, for example, Glucomannan—This natural fiber product is from the konjac plant. However, studies have found that herbal supplement comprising this fiber did not promote weight loss. and may have other undesired side effects such as loose stools, flatulence, diarrhea, constipation, and abdominal discomfort.

Various other diet pill products include ingredients such as Chitosan, Bitter Orange, Green Tea Extract, Raspberry Ketone and Forskolin. All of them have little to no effect on weight loss while some of them have adverse and dangerous side effects. For example, side effects of Aegeline (included in OxyElite Pro) has caused of death and severe injury were reported.

Other types of diet pills that suppress hunger are made from different fibers, such as Acacia fiber (also known as gum Arabic), which is a type of indigestible fiber promoted as a means of suppressing appetite and promoting fullness. However, to get a sustained effect, one needs to take a large amount for a long period (30 gram a day for more than 2 months), and potential side effects of consuming acacia fiber include gas, bloating and diarrhea.

Another type of diet pill is made of Agar (Kanten) Capsules "*Gelidium amansii* Lamouroux"). However, when using such pills, there is a risk of dehydration since theses pills absorb water. In addition, these pills may cause bowel obstruction or trouble swallowing, especially if not taken with enough water or other liquids.

Other "Diet drinks" and shakes have been proposed for weight loss diets. However, the use of such supplements (for example, Herbalife and Slimfast™) which aim for meal replacements, may not work well as a long-term meal plan and may have potential side effects associated with stimulants contained in such supplements.

Thus, there is still a need in the art for consumable products that include natural ingredients which are safe and cost effective and that can help to reduce or control daily caloric intake and efficiently induce satiety, without undesired side effects.

SUMMARY

Aspects of the disclosure, according to some embodiments thereof, relate to particles of Agar and Alginate, which are safe for consumption and can be used efficiently in satiety inducing food products. More specifically, but not exclusively, aspects of the disclosure, according to some embodiments thereof, relate to beverage formulations including gelling agents, such as Agar and Alginate particles, for inducing satiety and promoting weight loss in subjects consuming the products.

According to an aspect of some embodiments, there is provided a satiety inducing food product, such as, a beverage, yogurt, smoothie, and the like which includes: Agar and Alginate gel particles (also referred to herein as capsules) having a size range of about 0.3-30 mm and a solution (such as, as aqueous solution, including, water, milk, etc.) or mixture (such as an aqueous mixture, including, puree (fruits and/or vegetables) yogurt, etc.), wherein the Agar and Alginate capsules are configured to remain essentially intact in the stomach and in the intestine so as to occupy volume and/or apply pressure on sensors within the stomach and the intestine to thereby efficiently induce satiety. In some embodiments, without wishing to be bound to any theory or mechanism, the inducement of satiety by the advantageous particles disclosed herein can be direct (for example, by occupying volume and/or applying pressure on suitable sensors in the stomach and intestine and in-direct by affecting relevant hormone secretions, involved in hunger and/or metabolism, such as Ghrelin). Furthermore, in some embodiments, the particles are advantageous as they can absorb, at least to some extent, glucose from the stomach and intestine, when harbored therein. In some embodiments, the volume of consumed product, such as, beverage, may affect satiety through mechanoreceptors or chemoreceptors in the oropharyngeal or gastrointestinal tracts. Additionally, the volume of a preload could affect satiety by affecting the perception of how much has been consumed.

In some embodiments, the Agar+Alginate particles disclosed herein are further advantageous as they exhibit improved physical and/or mechanical properties, such as, functional, structural and/or chemical stability under various conditions, including pressure and heat. For example, as further demonstrated herein below, the advantageous Agar+Alginate particles are stable and can maintain their structural shape and activity even after being incubated at 100° C. for over one hour.

Advantageously, all types of particles, (e.g., Agar, Alginate and Agar+Alginate) induce satiety and do not digest by humans, however, each type of particle has different chemical and physical characteristics. The capsule mechanical characteristics is very important since the effect on satiety is controlled by the properties of the food we eat—energy, density and structure. Rupture testing, synonymous with puncture strength testing, is used to determine the puncture or rupture characteristics of a material. This is generally a compressive test, when a material is compressed by a probe or other type of device until the material ruptures or until an elongation limit is achieved. Rupture testing is commonly used to determine the strength of a material such as film, rubber or membrane. It is also often used in the food processing industry to determine the texture or ripeness of a product. Since the capsule gel are spherical the rapture test is good method to measure the mechanical strength. According to some embodiments, having a size distribution of about 0.3-30 mm, the advantageous particles disclosed herein are not too small to exit the gastrointestinal (GI) tract fast and are not be too big to clog the bowel. Thus, the use of such particles results in a safe appetite suppression, without undesired side effects and any other health risk.

According to some embodiments, the satiety inducing product (beverage or other mixture or solution) may include another type (one or more) of polysaccharide particles other than Agar and Alginate, including, for example, but not limited to, pectins, xanthan gum, carrageens or the like.

According to some embodiments, the capsules or particles disclosed herein have a size (diameter) range of about 0.3-30 mm, or any subrange thereof. For example, in some embodiments, the particles disclosed herein may have a size (diameter) range of about 0.3-20 mm. For example, in some embodiments, the particles disclosed herein may have a size (diameter) range of about 0.5-10 mm. For example, in some embodiments, the particles disclosed herein may have a size (diameter) range of about 2-8 mm. For example, in some embodiments, the particles disclosed herein have a size (diameter) range of about 1-5 mm.

According to some embodiments, the concentration of the particles in the satiety inducing food product may be in the range of about 10%-70% by weight, or any subranges thereof. For example, in some embodiments, the concentration of the particles may be in the range of about 15%-65%, by weight. For example, in some embodiments, the concentration of the particles may be in the range of about 20%-60%, by weight. In some embodiments, the concentration of the particles may be in the range of about 30%-50% (by weight). According to some embodiments, the concentration of the particles in the satiety inducing product may be in the range of about 10%-70% by volume, or any subranges thereof. For example, in some embodiments, the concentration of the particles may be in the range of about 15%-65%, by volume. For example, in some embodiments, the concentration of the particles may be in the range of about 20%-60%, by volume. In some embodiments, the concentration of the particles may be in the range of about 30%-50% by volume. In some embodiments the concentration of the particles in the beverage may be about 10%-70% (by weight or volume). In some embodiments, the concentration of particles in the beverage may be about 20%-60% (by weight or volume). In some embodiments the concentration of the particles in the beverage may be about 30%-50% (by weight or volume).

According to some embodiments, in the particles disclosed herein which include Agar and Alginate, the Agar and the Alginate are included in essentially equal amounts in the particles. In some embodiments, the concentration (by weight) of Agar in the Agar+Alginate particles is between about 0.3%-3%, or any subranges thereof. In some embodiments, the concentration of Agar in the Agar+Alginate particles is between about 0.4-2% (by weight). In some embodiments, the concentration of Agar in the Agar+Alginate particles is between about 0.5-1% (by weight). In some exemplary embodiments, the concentration of Agar in the Agar and Alginate particles is about 0.5% (by weight).

According to some embodiments, the Alginate concentration (by weight) in the Agar+Alginate particles is between about 0.3%-3%, or any subranges thereof. In some embodiments, the concentration of Alginate in the Agar+Alginate particles is between about 0.4-2% (by weight). In some embodiments, the concentration of Alginate in the Agar+Alginate particles is between about 0.5-1% (by weight). In some exemplary embodiments, the concentration of Alginate in the Agar+Alginate particles is about 0.5% (by weight).

According to some embodiments, the Agar and Alginate particles disclosed herein may be essentially homogenous in composition, dispersion (of Agar and Alginate within the particles), shape and/or size range. Each possibility is a separate embodiment.

In some embodiments, the Agar+Alginate particles disclosed herein are in the form of a core and shell, in which the core essentially or mainly includes Agar and the outer shell or coating essentially or mainly includes Alginate. In some embodiments, the Agar+Alginate particles may have a concentration gradient of Agar/Alginate within the particles. According to some embodiments, the Agar+Alginate particles may be essentially spherical. According to some embodiments, the Agar+Alginate particles may be essentially round. According to some embodiments, the Agar+Alginate particles may have bead-like structure. According to some embodiments, the Agar+Alginate particles may have various geometrical shapes.

According to some embodiments, a satiety inducing food product disclosed herein, such as a satiety inducing beverage solution or mixture, may include an essentially homogenous population of Agar+Alginate particles (with respect of size, composition and/or shape). Each possibility is a separate embodiment.

According to some embodiments, the satiety inducing food product disclosed herein may have any consistency, density, viscosity, homogeneity, heterogeneity, or running properties. For example, the product may be a liquid, a fluid, a suspension, a mixture, or a solution. In some embodiments, the product may be aqueous (such as, a beverage), or may be an aqueous solution or a mixture, such as, a puree (of fruits and/or vegetables), yogurt, smoothie, and the like, or any combinations thereof.

According to some embodiments, there is provided a satiety inducing food product which includes particles comprising Agar and Alginate, the particles having a size range of about 0.5-30 mm; and an aqueous solution or mixture; wherein the particles are configured to remain essentially intact in the stomach and in the intestine, so as to occupy volume within the stomach and the intestine to thereby induce satiety.

According to some embodiments the particles may have a size range of about 1-5 mm. According to some embodiments, the concentration of particles in the food product may be about 10%-70% (by weight). In some embodiments, the concentration of the particles in the food product may be about 20%-60% (by weight).

In some embodiments, the Agar concentration in the particles may be between about 0.25%-3% (by weight). In some embodiments, the Alginate concentration in the particles may be between about 0.25-3% by weight. In some embodiments, the particles include about 0.5% Agar and about 0.5% Alginate by weight. In some embodiments, the ratio between the Agar and the Alginate in the particles may be about 1:1 (w/w).

In some embodiments, the particles may further include one or more additional additives.

In some embodiments, the one or more additional additives may be selected from: L-carnitine, a vitamin, a protein, a flavoring material, a coloring material, or any combination thereof.

In some embodiments, the particles are essentially spherical. In some embodiments, the particles are essentially homogenous.

In some embodiments, the Alginate is coating an Agar core of the particles.

In some embodiments, the particles are stable at 100° C. for at least one hour.

In some embodiments, the food product is a beverage. In some embodiments, the beverage may further include one or more of: flavoring agents, colorants, gas, or any combination thereof, According to some embodiments, there is provided a satiety inducing composition which includes: essentially spherical, swallowable particles which include Agar and Alginate, wherein the particles are configured to be dispersed in an aqueous solution or mixture.

According to some embodiments, there is provided a satiety inducing beverage which includes essentially spherical, swallowable particles comprising a core comprising Agar, wherein the core is encapsulated in an Alginate core, wherein the particles are being dispersed in an aqueous solution.

According to some embodiments, the particles of the composition include a core consisting essentially of Agar and a shell consisting essentially of Alginate. According to other embodiments, the particles are essentially homogenous.

According to some embodiments, the particles may have a size range of about 0.5 mm-30 mm. According to some embodiments, the Agar concentration in the particles is between about 0.25%-3% (by weight). According to some embodiments, the Alginate concentration in the particles is between about 0.25%-3% (by weight). According to some embodiments, the particles of the composition may include about 0.5% Agar and about 0.5% Alginate by total weight.

According to some embodiments, a ratio between the Agar and the Alginate in the particles is about 1:1 (w/w).

According to some embodiments, the particles of the composition may include one or more additional additives. According to some embodiments, the one or more additional additives comprises: L-carnitine, a vitamin, a protein, a flavoring material, a coloring material, or any combination thereof.

According to some embodiments, the particles of the composition are stable at 100° C. for at least one hour.

According to some embodiments, the particles of the composition have a peak force of over about 0.6N in a rupture test.

According to some embodiments, the particles of the composition are configured to remain essentially intact in the stomach and in the intestine so as to occupy volume within the stomach and the intestine and thereby induce satiety. According to some embodiments, the particles may further be configured to absorb sugars in the stomach and/or intestine and wherein the particles are further is configured to be excreted together with the absorbed sugars via the feces, thereby reducing sugar content in the gastrointestinal (GI) tract.

According to some embodiments, the is provided a satiety inducing food product which includes essentially spherical, swallowable particles comprising a core comprising Agar, wherein the core is encapsulated in a Alginate core, wherein the particles being dispersed in an aqueous solution or mixture to form the satiety inducing food product.

According to some embodiments, the is provided a satiety inducing beverage which includes essentially spherical, swallowable particles comprising a core comprising Agar, wherein the core is encapsulated in a Alginate core, wherein the particles being dispersed in an aqueous medium to form the satiety inducing beverage.

According to some embodiments, there is provided a method of inducing satiety, the method includes administering to a subject the food product (such as, a beverage) or composition disclosed herein.

According to some embodiments, there is provided a method of reducing appetite, the method includes administering to a subject the food product (for example, a beverage) or composition disclosed herein.

According to some embodiments, there is provided a method of reducing blood sugar level, the method includes administering to a subject the beverage or composition disclosed herein.

According to some embodiments, there is provided a method of manufacturing the food product disclosed herein, the method includes: preparing particles of Agar and Alginate by the steps of: dissolving Agar in water to produce a solution having a concentration of between 0.25 to 3% Agar and heating said solution until the Agar is dissolved; dissolving Alginate powder in water to produce a solution having a concentration of between 0.5 to 3% Alginate; mixing the Agar solution and the Alginate solution to produce a mixed solution; cooling the mixed solution; dripping the mixed solution into an aqueous solution comprising Calcium salt to thereby obtain the particles; and mixing said particles in an aqueous solution or mixture to obtain the food product.

In some embodiments, the method may further include optionally introducing one or more additives to the mixed solution.

In some embodiments, the Calcium salt may be selected from: calcium lactate, calcium acetate, calcium carbonate, Calcium chloride, Calcium citrate, and Calcium gluconate. Each possibility is a separate embodiment. In some exemplary embodiments, the calcium salt is calcium lactate. In some embodiments, the Calcium salt is at a concentration of about 0.5-3.5%.

In some embodiments, the agar solution may be heated to a temperature of about 70-100° C.

In some embodiments, the mixed solution may be cooled to a temperature of about 30-70° C.

In some embodiments, the Calcium-salt aqueous solution may be at a temperature of about 4-70° C.

According to some embodiments, there is provided a method of manufacturing a satiety inducing composition, the method includes: dissolving Agar in water to produce a solution having a concentration of between 0.25 to 3% Agar and heating said solution until the Agar is dissolved; dissolving Alginate powder in water to produce a solution having a concentration of between 0.5 to 3% Alginate; mixing the Agar solution and the Alginate solution to produce a mixed solution; cooling the mixed solution; and dripping the mixed solution into an aqueous solution comprising Calcium salt to thereby obtain the particles. According to some embodiments, the method may further include dispersing the swallowable particles in an aqueous solution or mixture to produce a satiety inducing food product.

According to some embodiments, the food product is selected from: a beverage, a running dairy product, yogurt, pudding, puree of vegetable(s) and/or fruit(s), a smoothie and porridge. Each possibility is a separate embodiment.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not to scale.

In the Figures:

FIG. 8A—curve graph of rupture test of Agar+Alginate particles; FIG. 8B—curve graph of rupture test of Alginate particles; FIG. 8C—curve graph of rupture test of Agar particles. The arrow indicates the peak force in which the particles rupture.

DETAILED DESCRIPTION

Figure 1:
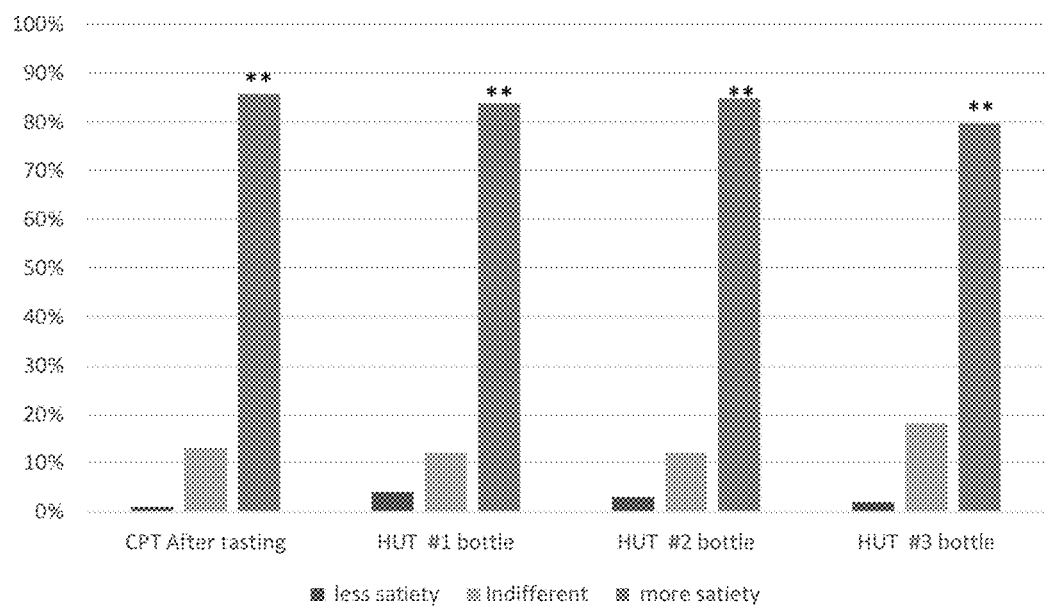
FIG. 1: Bar graphs summarizing the results of satiety feeling test in subjects consuming a satiety inducing beverage having particles, according to some embodiments. The results (percentage) presented are based on questionnaires to users to describe their degree of satiety feeling (less, indifferent or more satiety) after consuming a beverage with particles disclosed herein. The questionnaires were executed after first consumption test (CPT), as well as three additional later consumptions (HUT). Significance was tested compered to "indifferent". T-Test **$p<0.05$. (n=100)

The principles, use and implementations of the teachings herein may be better understood with reference to the accompanying description and figures. Upon perusal of the description and figures present herein, one skilled in the art will be able to implement the teachings herein without undue effort or experimentation.

According to some embodiments, the present invention provides compositions, food products and methods for enhancing satiety, for lowering amount of daily food intake, and for improving glycemic control, by reducing glucose levels.

According to some embodiments, the present invention is based on advantageous Agar+Alginate particles, which include natural and safe ingredients (Agar from sea alga and Alginate) that can be used in various consumable and edible food products, such as, beverages, configured to induce satiety.

The advantageous particles disclosed herein overcome various disadvantages of the art. For example, Agar is safe for use by adults when taken orally, only with a large volume of liquid (for example, with at least 200 ml of water). When Agar is not consumed with enough liquid, the Agar can swell and block the esophagus or bowel. However, Agar by itself (alone) is hard to swallow and thus, the advantageous particles disclosed herein overcome this obstacle, by providing the Agar in the particles already saturated with water and not in a dry state which are in combination with Alginate, further enhancing the safe and convenient use.

The consumable food product (such as, beverage, solution or mixture, including, purees, yogurt, smoothie, pudding, porridge, etc.) based on the particles of Agar and Alginate provided herein, in accordance with some embodiments, facilitates controlling satiety and hunger. In some embodiments, it does not replace a meal but rather can aid in the control of hunger and following a diet planned caloric target for a long term, without losing the freedom to enjoy the consumed food and without risking dehydration, bowel obstruction or having trouble swallowing.

As used herein, the term "Agar" is directed to Agar Agar, which is a jelly-like substance, obtained from red algae. Agar is a mixture of two components: the linear polysaccharide agarose, and a heterogeneous mixture of smaller molecules called agaropectin. It forms the supporting structure in the cell walls of certain species of algae and is released upon boiling. These algae are known as agarophytes which belong to the Rhodophyta (red algae) phylum. Agar has been used as an ingredient in food (such as, desserts) throughout Asia, and also as a solid substrate to contain culture media for microbiological work. Agar can be used as a laxative, an appetite suppressant, a vegetarian substitute for gelatin, a thickener for soups, in fruit preserves, ice cream, and other desserts, as a clarifying agent in brewing, and for sizing paper and fabrics. The gelling agent in agar is an unbranched polysaccharide obtained from the cell walls of some species of red algae, primarily from tengusa (Gelidiaceae) and ogonori (Gracilaria). For commercial purposes, it is derived primarily from ogonori. Agar is a polymer made up of subunits of the sugar galactose.

Agar polysaccharides are not digestible by humans; and therefore, Agar does not have caloric value.

As used herein, the term "Alginate" is directed to include salts of alginic acid (such as, sodium alginate), derivatives of alginic acid and alginic acid. Alginates are refined from brown seaweeds. A wide variety of brown seaweeds of the class Phaeophyceae are harvested to be converted into the raw material sodium alginate. Sodium alginate is used in a variety of industries including food, textile printing and pharmaceuticals. For example, Dental impression material utilizes alginate as its means of gelling. Alginate is digestible in humans' gastric fluids to some extent, mainly in the small intestine[4]. Alginate is a water-soluble polymer, the swelling and deswelling properties thereof are sensitive to the environmental pH. This property is of importance for controlling release of encapsulated materials in colon condition.

As used herein, the term "L-carnitine" is directed to a naturally occurring amino acid derivative that may be used as a food supplement. L-carnitine's main role in the body involves mitochondrial function and energy production. In cells, it helps transport fatty acids into the mitochondria, where they can be burned for energy.

As used herein, the term "capsule", "gel capsule", "particle" and "gel particle" may be used interchangeably. The terms relate to various particles made of Agar, Alginate, or a combination of Agar and Alginate (Agar+Alginate), as disclosed and exemplified herein. In some embodiments, the particles may further include one or more additives. In some embodiments, the particles are consumable and may be added to various types of food products of various consistency, density and/or fluidity, including, beverage, liquid food, aqueous mixture food, aqueous solution food, solid food, semi-solid food, and the like. Each possibility is a separate embodiment. In some embodiments, the particles may assume any type of geometrical shape, such as, for example, spherical, round, and the like. In some embodiments, the particles may be homogenous, partially homogeneous or may be in the form of a core and a shell (coating). Each possibility is a separate embodiment. In some exemplary embodiments, the particles are particles made of Agar and Alginate at a weight ratio of about 1:1.

As used herein, the term "composition" and "formulation" may be used interchangeably. The terms relate to a composition which includes the particles disclosed herein, at various concentrations, which may be added to various food products, as detailed herein.

As used herein, the terms "satiety inducing food product" and "food product" may interchangeably be used. The terms are directed to a consumable/swallowable, food product, that may be consumed by a subject and which includes the particles of the present disclosure, at any concentration or amount (for example, 15-75% by weight), essentially as detailed herein. In some embodiments, the food product disclosed herein may have any consistency, density, viscosity, homogeneity, heterogeneity, or running properties. For example, the product may be a liquid, a fluid, a suspension, a mixture, a blend, or a solution. In some embodiments, the product may be a running liquid (such as, a beverage). In some embodiments, the product may be an aqueous solution. In some embodiments, the product may be a solution or a mixture of any consistency, viscosity or fluidity, including such products as, but not limited to: puree (of fruits and/or vegetables), yogurt, smoothie, pudding, porridge, and the like, or any combinations thereof. Each possibility is a separate embodiment. In some embodiments, the beverage food product may be any type of beverage, including, water (with or without one or more additives (including flavorants or colorants), carbonated water, beer, milk, filtered or un-filtered fruit juice, running milk or milk product (such as, flavored milk product), and the like, or any combination thereof. Each possibility is a separate embodiment. In some embodiments, the food product may be solid or semi-solid food product.

The term "additive" is directed to any additional substance (other than Agar and/or Alginate) that may be included in the particles. The additive may be any type of additive, including, but not limited to: amino acids, proteins, fatty acid, vitamins, minerals, flavoring agents, coloring agents, fruits, chocolate, dairy products, and the like, or any combination thereof. In some embodiments, the additives may be added to the particles during the preparation of the particles.

According to some embodiments, and as exemplified herein, the particles disclosed have physical characteristics configured to adsorb sugars in a high sugar liquid solution, similar to the environment in the stomach and intestine.

According to some embodiments, and as exemplified herein, the beverage or other food product carrying the particles provided herein, is configured to reduce sugars from the stomach and intestine by diffusion into the gel and disposal via the feces.

According to some embodiments, the particles disclosed herein can induce satiety and do not digest by human subjects.

According to some embodiments, there is provided herein a particle-based consumable food product, such as, a beverage or any other type of liquid or semi-liquid mixture or solution, that includes a combination of two gel/particulate types: Agar and Alginate.

According to some embodiments the particle-based food product, such as, a beverage may include Agar particles (e.g., essentially spherical particles) and Alginate particles (e.g., essentially spherical particles). In some embodiments, the particles are made of a combination of Agar and Alginate, as detailed below.

According to some embodiments the particle-based food product (such as, a beverage, yogurt, puree, smoothie, and the like), may include mixed capsules (e.g., essentially spherical particles) containing Agar and Alginate in a ratio of about 1:1. In some embodiments, the capsules are produced in one step and the Alginate may be coating the agar during the formulation process. In some embodiments, the particles are essentially homogenous, whereby the Agar and Alginate are homogeneously mixed in the formed particles.

Advantageously, the particles disclosed herein are configured to stimulate the satiety signals by occupying the digestion system and signaling to the brain. Advantageously, the particles, (e.g., Agar and Alginate particles) induce satiety. In some embodiments, each type of particulate material (Agar and/or Alginate) may have different chemical characteristics. For example, both Agar and Alginate can absorb nutrients, such as sugars, in the entire digestion system, as exemplified hereinbelow. Alginate differs from Agar, due to its pH dependent characteristics, therefore, in some embodiments, it can prevent the inner ingredients or additives in the capsule (for example, vitamins and proteins) from digestion by the gastric acid in the stomach (pH 2). In some embodiments, in the intestine where the pH is natural, the alginate properties may allow such inner ingredients to be released and at the same time absorb sugars (from the intestine into the capsule). Therefore, the particles disclosed herein may function as a delivery system for vitamins, protein and other additives into the intestine and at the same time can absorb sugars.

According to other embodiments, the particle-based food product (such as, beverage, or other suitable food product as disclosed herein) may include essentially spherical particles/capsules having an Agar core encapsulated (coated) by an Alginate shell. The essentially spherical capsule is easy to swallow compered to shredded Agar particles and taste better.

According to other embodiments, the particle-based food product (such as beverage or any other type of suitable food product) may include essentially spherical particles/capsules made of Agar and Alginate, essentially at a ratio of 1:1. Such particles are easy to swallow compered to shredded Agar particles and taste better.

Advantageously, the particles are easy to swallow, and they are configured to prevent content degradation from gastric acid in the stomach while releasing the particles content (for example, additives, such as, L-carnitine, vitamins and/or proteins) in the intestine at natural pH, while maintaining the volume of the particles effect in the intestine for satiety sensation, as exemplified herein below.

Advantageously, the capsules exhibit thermal stability and can be heated to 100° C. for one or more hours to sterilize and to extend shelf life. The capsules thermal stability characteristics are advantageous in the shelf life of the product. The thermal stability is embodied by maintaining the shape, size and/or composition of the particles.

Advantageously, the capsules are configured to reduce sugars from the intestine by diffusion into the particle and disposal thereof via the feces, as exemplified herein.

According to some embodiments, the capsules or particles may include a polysaccharide (e.g., alginate) coating.

According to some embodiments, the beverage may have a calorie content of about 1-40 calories per 100 ml of beverage. According to some embodiments, the beverage may have a caloric content of about 1-400 calories per 100 ml of beverage.

According to some embodiments, the Agar+Alginate capsules or particles may include additives, such as nutritional additives, for example, but not limited to: L-carnitine, one or more types of vitamins, one or more types of proteins, one or more types of flavoring materials or any combination thereof.

According to some embodiments, the Agar+Alginate capsules or particles may be essentially spherical.

According to other embodiments, the agar particles may have a rough outer surface.

According to an aspect of some embodiments, there is provided a satiety inducing composition comprising: essentially spherical, swallowable particles comprising a core comprising Agar, wherein the core is encapsulated in a polysaccharide shell, wherein the polysaccharide shell comprises alginates, and optionally one or more of: pectins, xanthan gum, carrageen, or any combination thereof. The particles are configured to be dispersed in an aqueous solution.

According to some embodiments, the core consists essentially of Agar gel and wherein the shell consists essentially of Alginate gel.

According to some embodiments, the particles having a size range of about 0.5 mm-30 mm, or any subranges thereof.

According to some embodiments, the Agar concentration in the Agar core is between about 0.5%-3% (by weight), or any subranges thereof.

According to some embodiments, the Agar+Alginate capsules or particles may further include additives, such as nutritional additives, for example, but not limited to: L-carnitine, one or more types of vitamins, one or more types of proteins, one or more types of flavoring materials, one or more types of preservatives and one or more types of colorants.

According to some embodiments, the Agar+Alginate capsules or particles can be added to mixtures or solutions, such as, for example, dairy products, including yogurt, fruit and/or vegetables mixtures or blends (such as, smoothies, purees), pudding, custard, porridge, and the like, or any combination thereof. Each possibility is a separate embodiment.

According to some embodiments, the Agar+Alginate capsules can be produced or manufactured as snack bar and can be consumed/eaten as a solid food product.

According to some embodiments, the shell is configured to remain essentially intact in the stomach, while allowing the release of the one or more additive materials in the intestine and wherein the core is configured to remain essentially intact in the stomach and in the intestine so as to occupy volume within the stomach and the intestine and thereby induce satiety.

According to some embodiments, the core may further be configured to absorb/adsorb sugars (e.g., glucose) in the stomach and/or intestine and wherein the core is configured to be excreted with the absorbed sugars via the feces, thereby reducing sugar content in the gastrointestinal (GI) tract.

According to some embodiments, the Agar core has a rough outer surface area. The rough outer surface can be unpleasant to swallow by some people, and the fact that the core is coated by a spherical (Alginate) coating helps.

According to an aspect of some embodiments, there is provided a satiety inducing beverage comprising: essentially spherical, swallowable particles comprising a core comprising Agar, wherein the core is encapsulated in a polysaccharide shell, wherein the polysaccharide shell comprises alginates, and optionally one or more of: pectins, xanthan gum, carrageen, or any combination thereof, the particles being dispersed in an aqueous solution.

According to an aspect of some embodiments, there is provided herein a method of inducing satiety, the method comprises administering to a subject the food product (such as, beverage, yogurt, pudding, smoothie, puree), or composition as disclosed herein.

According to an aspect of some embodiments, there is method of reducing appetite, the method comprises administering to a subject the food product (such as, beverage, yogurt, pudding, smoothie, puree, etc.) or composition disclosed herein.

According to an aspect of some embodiments, there is a method of reducing blood sugar (e.g., glucose) level, the method comprises administering to a subject the food product or composition disclosed herein.

According to an aspect of some embodiments, there is provided herein a method of manufacturing the food product (such as, beverage) disclosed herein, the method includes: dissolving Agar in water to produce a solution having a concentration between 0.5 to 3%, heating until the Agar is dissolved, cooling the solution to form a stable Agar gel, and grinding the Agar into Agar particles having a size of between about 0.5 mm-30 mm. The particles' size may be controlled by passing the Agar particles via a strainer for each desired size.

The method may further include dispersing the Agar particles in an aqueous solution to produce the beverage food product. The method may further include dispersing Alginate particles in the aqueous solution to produce the food product, such as, beverage, yogurt, puree, smoothie, pudding, etc.

According to some embodiments, manufacturing the Alginate particles includes: dissolving Alginate powder in water to produce a solution having a concentration between 0.5 to 3%, optionally, adding additives to the solution and dripping the solution, using a pipette, into calcium lactate aqueous solution of about 0.5%-3% to produce sphere shaped Alginate particles having sizes of between about 0.5-30 mm.

According to an aspect of some embodiments, there is provided herein a method of manufacturing the satiety inducing composition disclosed herein, the method includes: dissolving polysaccharide powder (Agar) in water to produce a polysaccharide solution having a concentration between 0.5 to 3%, dispersing particles into the polysaccharide solution (with or without additives) to form a suspension of Agar particles into polysaccharide solution by heating up to boiling. Dissolving Alginate powder in water to produce a solution having a concentration between 0.5 to 3%. Mix the two polysaccharide solutions and cool to temperature between 50 to 60° C. Drip the solution, using a pipette, into calcium lactate aqueous solution of about 0.5%-3%, at temperature between 25 to 40° C. The dripping solution produce essentially spherical, swallowable particles comprising a core comprising Agar, wherein the core is encapsulated in an Alginate polysaccharide shell. The gel particles with the polysaccharide shell can be boiled, therefore can be pasteurized/sterilized during preparation. The method may further include dispersing the swallowable particles in a suitable solution (Such as, an aqueous solution) to produce a satiety inducing food product, such as, a beverage, yogurt, puree, smoothie, pudding, porridge, and the like.

According to some embodiments, the particle-beverage provided herein, is configured to stimulate the satiety signals by occupying the digestion system and signaling to the brain. As exemplified below, over 80% of users report more satiety feeling after consuming 3 servings (Example 3 herein). In some embodiments, the particles may be produced in one step and the Alginate may be coating the Agar during the formulation process. Advantageously, all types of particles induce satiety and are not digestible by humans, however, each type of particle has different chemical and physical characteristics (examples 4-6). Shredded Agar particles are efficient to stimulate satiety but are hard to swallow and are not stable. Alginate particles are less efficient to stimulate satiety and have a disadvantage is the metal aftertaste.

According to other embodiments, the particle-based beverage includes essentially spherical particles/capsules having an Agar core encapsulated (coated) by an Alginate shell. The essentially spherical capsule is easy to swallow compered to shredded Agar particles and taste better than both Agar and Alginate each. Advantageously, the Agar+Alginate particles have thermal stability and can be heated to 100° C. to sterilize. The capsules thermal stability characteristics have advantages in the shelf life of the product. Advantageously, the particles are stimulating satiety by occupying the digest system. The Agar+Alginate particles is larger and stiffer compared to Agar or Alginate alone. Advantageously, the particles can reduce sugars from the stomach and intestine by diffusion into the gel and disposal via the feces (Example 7). According to some embodiments, the Agar+Alginate particles have a peak force of over about 0.4N, in a rupture test. According to some embodiments, the Agar+Alginate particles have a peak force of over about 0.5N, in a rupture test. According to some embodiments, the Agar+Alginate particles have a peak force of over about 0.6N, in a rupture test. According to some embodiments, the Agar+Alginate particles have a peak force of over about 0.7N, in a rupture test. According to some embodiments, the Agar+Alginate particles have a peak force of at least about 0.4N, in a rupture test. According to some embodiments, the Agar+Alginate particles have a peak force of at least about 0.5N, in a rupture test. According to some embodiments, the Agar+Alginate particles have a peak force of at least about 0.6N, in a rupture test. According to some embodiments, the Agar+Alginate particles have a peak force of at least about 0.7N, in a rupture test. In some embodiments, the rupture test is performed using Digital force gauge EFG series (ENPI).

According to some embodiments, the Agar+Alginate particles have thermal stability and are stable at a temperature of at least 80° C. for at least 30 minutes, at least 45 minutes, or at least 60 minutes. According to some embodiments, the Agar+Alginate particles have thermal stability and are stable at a temperature of at least 90° C. for at least 30 minutes, at least 45 minutes, or at least 60 minutes. According to some embodiments, the Agar+Alginate particles have thermal stability and are stable at a temperature of at least 100° C. for at least 30 minutes, at least 45 minutes, or at least 60 minutes. According to some embodiments, the Agar+Alginate particles have thermal stability and are stable at a temperature of 95° C. or more for at least 30 minutes, at least 45 minutes, or at least 60 minutes. Each possibility is a separate embodiment.

According to an aspect of some embodiments, there is provided a satiety inducing food product (such as, beverage) comprising: agar particles having a size range of about 0.3-30 mm and water, wherein the Agar particles are configured to remain essentially intact in the stomach and in the intestine so as to occupy volume within the stomach and the intestine and thereby induce satiety.

According to an aspect of some embodiments, there is provided a satiety inducing food product (such as, beverage) comprising: Alginate particles having a size range of about 0.5-20 mm and water, wherein the Alginate particles are configured to remain essentially intact in the stomach and in the intestine so as to occupy volume within the stomach and the intestine and thereby induce satiety.

According to some embodiments, there is provided a satiety inducing beverage comprising: particles comprising Agar and Alginate, said particles having a size range of about 0.5-30 mm; and water; wherein the particles are configured to remain essentially intact in the stomach and in the intestine, so as to occupy volume within the stomach and the intestine to thereby induce satiety.

According to some embodiments, there is provided a satiety inducing food product which includes:
particles comprising Agar and Alginate, said particles having a size range of about 0.5-30 mm; and
an aqueous solution or mixture;
wherein the particles are configured to remain essentially intact in the stomach and in the intestine, so as to occupy volume within the stomach and the intestine to thereby induce satiety.

According to some embodiments, there is provided a method of manufacturing the food product disclosed herein, the method may include one or more of the steps of:
preparing particles of Agar and Alginate by the steps of:
dissolving Agar in water to produce a solution having a concentration of between 0.25 to 3% Agar and heating said solution until the Agar is dissolved;
dissolving Alginate powder in water to produce a solution having a concentration of between 0.5 to 3% Alginate;
mixing the Agar solution and the Alginate solution to produce a mixed solution;
cooling the mixed solution;
dripping the mixed solution into an aqueous solution comprising Calcium salt to thereby obtain the particles; and
mixing the particles in an aqueous solution or mixture to obtain the food product.

According to some embodiments, there is provided a method of manufacturing the satiety inducing composition as disclosed herein, the method may include one or more of the steps of:
dissolving Agar in water to produce a solution having a concentration of between 0.25 to 3% Agar and heating said solution until the Agar is dissolved;
dissolving Alginate powder in water to produce a solution having a concentration of between 0.5 to 3% Alginate;
mixing the Agar solution and the Alginate solution to produce a mixed solution;
cooling the mixed solution; and
dripping the mixed solution into an aqueous solution comprising Calcium salt to thereby obtain the particles.

According to some embodiments, there is provided a method of preparing particles of Agar and Alginate particles, the method may include the steps of:
dissolving Alginate powder in water to produce a solution having a concentration of between 0.5 to 3% (Typically 1%);
optionally-adding additives such as, vitamins (such as Zinc, B1, B12, D, iron and Magnesium), proteins, L-carnitine, to the alginate solution at a desired concentration;
mixing Agar particles into the Alginate solution to form a suspension of Agar particles in Alginate solution; wherein the Agar particles are formed by: dissolving Agar particles in water and heating (60-100° C.) to obtain a solution of Agar; and cooling the Agar solution to form a stable Agar gel
dripping the Alginate-Agar solution into a calcium salt (such as calcium lactate) aqueous solution (of between about 0.5%-3%), to obtain the particles of Agar and Alginate.

Advantageously, the food product (such as, beverage) disclosed herein, according to some embodiments, combines a drink with high fiber gel particles that reduce hunger and maintain or improve healthiness of a subject using the product. The food product disclosed herein, according to some embodiments, includes gel particles occupying the entire (or at least part of the) digestive system; as a result, the hunger or appetite are reduced, and help users to succeed in a diet regime. The product may be taken/consumed/used for long periods on a daily basis.

The particle-based food product provided herein, according to some embodiments, provides other advantages, together with satiety and controlling appetite, for example, low caloric content, rich with healthy fibers, it improves metabolic parameters such as control of blood glucose, and it improves gut microbiome functionality.

The food product having the particles, provided herein, according to some embodiments, may be produced with different tastes or flavors by mixing it with any other ready to eat/drink product, such as, but not limited to, natural food extracts from fresh vegetables and fruits and low saturated fat oil. The particle-based food product provided herein, according to some embodiments, may also be adapted to different nutritional needs. Nutrients such as vitamins and minerals may be added to the mixture to supply the human body with the necessary nutrients.

The gel capsule provided herein, according to some embodiments, can be added to dairy products such as yogurt, smoothies or pudding.

The combination between Agar and Alginate provided herein, according to some embodiments, can be produced and provided as a solid or semi-solid food like snack-bar.

In some embodiments, the present disclosure relates to methods of using the particles disclosed herein to prepare foods or beverages as well as to foods and beverages prepared using these methods. In some embodiments, the present disclosure relates to methods of treating overweight, treating obesity or maintaining weight in a subject. In another embodiment, the disclosure provides a method of enhancing glycemic control in a subject. In some embodiments, the subject consuming the products disclosed herein is in need of weight and/or shape-management with a BMI of less than 25. In some embodiments, the subject consuming the products disclosed herein may be in need of weight loss or weight maintenance. In some embodiments, the subject can be overweight, with a BMI of 25 to 30, or obese, with a BMI greater than 30. In some embodiments, the subject can also be of normal weight, with a BMI less than 25, but at risk for weight gain. In some embodiments, the subject may be in need of glycemic control.

In the description and claims of the application, the words "include" and "have", and forms thereof, are not limited to members in a list with which the words may be associated.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although steps of methods according to some embodiments may be described in a specific sequence, methods of the disclosure may include some or all of the described steps carried out in a different order. A method of the disclosure may include a few of the steps described or all of the steps described. No particular step in a disclosed method is to be considered an essential step of that method, unless explicitly specified as such.

Although the disclosure is described in conjunction with specific embodiments thereof, it is evident that numerous alternatives, modifications and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

EXAMPLES

Example 1—Preparation of Agar and Alginate Particles i. Preparation of Agar particles:
Agar Particles were Prepared by the Following Steps:
 1. Agar powder (e406) was dissolved in water and heated (60-100° C.) until the agar was fully dissolved to obtain a solution having a concentration of between 0.5 to 3% (typically, 1%);
 2. The solution is cooled to form a stable agar gel;
    In some experiments, the solution was cooled to about 60° C. and additives, including vitamins (such as Zinc, B1, B12, D, iron and Magnesium), proteins and/or other additives were added at a desired concentration. The solution was then cooled to form a stable agar gel having the additive dispersed therewithin;

3. The Agar gel was grinded into particles having a size of about 0.5 mm-30 mm (average, about 3 mm). The size of the obtained particles was controlled by passing the Agar particles via a suitable strainer for each size.

ii. Preparation of Alginate Particles:

Alginate Particles were Made by the Following Steps:
1. Alginate powder was dissolved in water to produce a solution having a concentration between 0.5 to 3%. In some experiments, additives e.g., vitamins (such as Zinc, B1, B12, D, iron and Magnesium), proteins, such as L-carnitine, or other additives were added to the solution, at a desired concentration;
2. The solution was dripped, using a pipette, into a calcium lactate aqueous solution (of about 0.5%-3%) to produce alginate particles having sizes of between about 0.5-30 mm.

iii. Preparation of Agar-Alginate Particles

Agar Particles Coated with Alginate were Manufactured by the Following Steps:
1. Alginate powder was dissolved in water to produce a solution having a concentration between 0.5 to 3% (Typically 1%); In some experiments, additives such as, vitamins (such as Zinc, B1, B12, D, iron and Magnesium), proteins, L-carnitine, or other additives were added to the alginate solution at a desired concentration;
2. Agar particles (manufactured, as disclosed herein above) were mixed into the Alginate solution (with or without the additives) to form a suspension of Agar particles in Alginate solution;
3. The obtained solution was dripped, using a pipette, into a calcium lactate aqueous solution (of between about 0.5%-3% (typically about 1%)), to produce sphere shaped Alginate coated agar particles having sizes of between about 5 mm.

Agar+Alginate Capsule Particles were Manufactured as Follows:
1. Alginate powder was dissolved in water to produce a solution having a concentration of between 0.5 to 3% (typically 1%) and boiled until fully dissolved.
2. Alginate powder was dissolved in water to produce a solution having a concentration between 0.5 to 3% (typically 1%);
3. The two solutions thus obtained were mixed in a ratio of about 1:1 to obtain a mixed solution. The mixed solution was cooled to a temperature of between 30-70° C. (typically 55° C.) and additives e.g., vitamins (such as Zinc, B1, B12, D, iron and Magnesium), proteins or other additives were added.
4. The cooled solution was dripped, using a pipette, into a calcium lactate aqueous solution (of about 0.5%-3% (typically 1%), at a temperature of between about 4 to 70° C. (typically, 30° C.)), to produce sphere shaped Agar-Alginate particles having a size in the range of between about 0.5-30 mm (typically about 5 mm).

Example 2—Preparation of Various Food Products Containing Particles

To prepare a food product for consumption, particles prepared as in Example 1 above, were added (mixed) at a concentration of 15-75% of the total volume (or weight) of the food product, to obtain a food product containing the particles.

To prepare a beverage for consumption, the particles prepared as in Example 1 above were introduced (mixed) with water to obtain a beverage having particles volume (or weight) of between 20-70% of the total volume (or weight) of the beverage. The water optionally further included one or more additives (including, for example flavoring agents (flavorants) and food colors). In some instances, the beverage into which the particles are mixed is a premade beverage, including, soda water (carbonated water), beer, milk, filtered or un-filtered fruit juice. The resulting beverage was used for further testing, as detailed below.

To prepare a yogurt for consumption, the particles prepared as in Example 1 above were introduced (mixed) with prepared yogurt, to obtain a yogurt having particles in a volume (or weight) of between 20-70% of the total volume (or weight) of the yogurt.

To prepare a smoothie for consumption, the particles prepared as in Example 1 above were introduced (mixed) with prepared smoothie (including a blend of fruits and/or vegetables), to obtain a smoothie having particles in a volume (or weight) of between 20-70% of the total volume (or weight) of the smoothie.

To prepare a puree for consumption, the particles prepared as in Example 1 above were introduced (mixed) with prepared fruit or vegetable puree (including a blend of fruits and/or vegetables), to obtain a puree having particles in a volume (or weight) of between 20-70% of the total volume (or weight) of the puree.

To prepare a pudding or porridge for consumption, the particles prepared as in Example 1 above were introduced (mixed) with prepared pudding or porridge, to obtain a product having particles in a volume (or weight) of between 20-70% of the total volume (or weight) of the pudding or porridge.

Example 3: Beverage with Particles—Testing Satiety Feeling in Humans in Sensory Experiments A sensory test was performed to examine the satiety filling of subjects which consumed a beverage with the capsules. 100 adults (50 men and 50 women) participated in the study, according to the following segmentation: Age of participants: 20-60 years, of which, age 20-35, 33%, age 36-45, 33%, age 46-60 33%). Medium and above socioeconomic status. Participants were self-defined as people who considered weight maintenance/loss as an important goal, who do not distaste beverages containing pieces (such as Aloe Vera or Tapioca) and are able to swallow pills.

Stage 1—CPT (concept product test) research for conceptual and sensory evaluation. The research was conducted using personal interviews (one on one), among the target participants. The participants were gradually exposed to the Agar+Alginate capsules in a beverage. At the tasting stage, each participant received one bottle (500 ml water (with flavorings) and about 50% capsules of total volume (or weight)) to taste.

Stage 2—HUT (Home Usage Test) research, including the following stages: After stage 1, the participants were asked if they will be willing to take 3 additional bottles (total of 1.5 liters) for a 24 hours trial. During this phase and in order to trace the individual consumption habit of the product, each participant received a link every 12 hours in order to learn if he/she had consumed the beverage.

Thereafter, the participant received a self-compliance questionnaire for each bottle consumed, designed to understand the participant's impression of the product, his/her sense of satiety, eating habits throughout the day, the amount of drinking in practice and the feeling while consuming the product.

Table 1 below summarize the satiety filling after testing the beverage contain the capsules (CPT research), and after each bottle at home (HUT research). As shown in the results presented in Table 1, the satiety filling which was reported from the first bottle in the CPT research and all along the HUT research was over 80% (significantly higher as compared to "indifferent").

TABLE 1

Satiety after consuming a beverage with Agar-Alginate capsules

| How would you describe your satiety after drinking? | less satiety | Indifferent | more satiety | Statistical Sig. |
|---|---|---|---|---|
| CPT After tasting | 1% | 13% | 86% | ** |
| bottle #1 HUT | 4% | 12% | 84% | ** |
| bottle #2 HUT | 3% | 12% | 85% | ** |
| bottle #3 HUT | 2% | 18% | 80% | ** |

% represent the percentage of tested participants (n = 100), Significance was tested compered to "indifferent".
T Test ** p < 0.05.

The results are further presented in FIG. 1, the bar graphs of which show the filling sensation (satiety) after testing the beverage that contains the Agar-Alginate Particles (CPT research), and after each bottle at home (HUT research). Significance was tested compered to "indifferent". T Test **p<0.05. (n=100).

Figure 2:
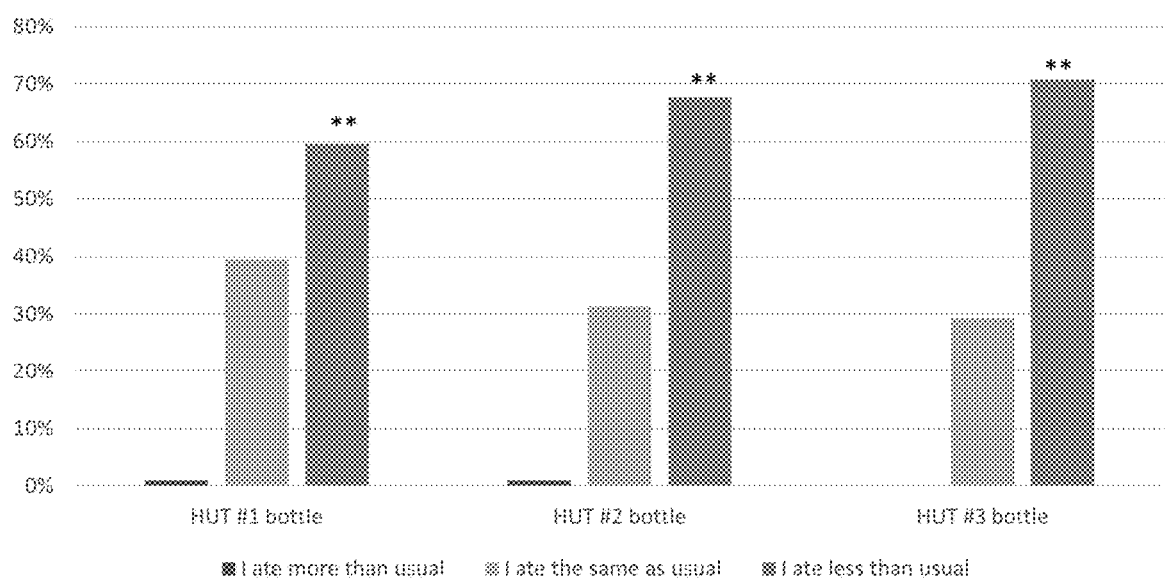
FIG. 2: Bar graphs summarizing the results of testing the effect on eating in subjects after consuming the satiety inducing beverage having particles, according to some embodiments. The results (percentage) presented are based on questionnaires to users to describe the effect on eating (more than usual, same as usual, less than usual), after consuming the beverage at home (HUT). Significance was tested compered to "I ate the same as usual". Chi-squared test **$p<0.05$ (n=100).

Further, the effect on food consumption (eating) after consuming the beverage with the capsules at home (HUT research) was determined. The results of a questionnaire asking the users to compare their food consumption after consuming the product each time (after each bottle) are presented in Table 2 below and in the bar graphs of FIG. 2. The results clearly show that between about 60% to 70% consumers reported they eat less (significantly compared to "I ate the same as usual"). The percentage of users who reported to eat less was increased with consumption of each bottle, apparently increasing the effect of satiety.

TABLE 2

Eating after consuming a beverage with Agar-Alginate capsules

| Did you eat less during the home trial? | I ate more than usual | I ate the same as usual | I ate less than usual | Statistical Sig. |
|---|---|---|---|---|
| HUT #1 bottle | 1% | 39% | 60% | ** |
| HUT #2 bottle | 1% | 31% | 68% | ** |
| HUT #3 bottle | 0% | 29% | 71% | ** |

% represent the percentage from population (n = 100), Significance was tested compered to "I ate the same as usual".
Chi-squared test ** p < 0.05.

The results presented herein clearly demonstrate the effect of consuming the beverage with the Agar-Alginate particles on satiety and food intake.

Example 4: In-Vitro Digestion Resistance of Various Tested Particles: Agar, Alginate or Agar-Alginate Capsules Digestion Resistance of various tested particles (Agar, Alginate or Agar-Alginate (ratio 1:1)) were tested for resistance and size using in-vitro digestion system, essentially as described in Brodkorb et al. The experiment was performed at the Lab of Food Chemistry & Bioactives Dept. of Biotechnology and Food Engineering, Technion, Israel.

Detailed experimental methods are described in Brodkorb et al. In brief, 30 gr of each particles sample is added to Semi dynamic digestion system (components of which are listed in Table 3 and hereinbelow):

TABLE 3

GI (Gastrointestinal) digestion enzymes and ions:

| Stomach | Tested Particles | 30 gr |
|---|---|---|
| | SGF- Simulated Gastric Fluids | 70 ml |
| | Pepsin | Gastric levels |
| | HCl 0.25M | Titration |
| | Glucose 6% | 6 gr |
| Duodenum | Stomach digesta | 50 ml |
| | SDF- Simulated Duodenal Fluids | 50 ml |
| | Pancreatin- Pancreatic enzymes | Duodenal levels |
| | Bile extract | Gallbladder levels |
| | NaOH 0.25M | Titration |

1. NaOH and PMSF are used to neutralize enzymes from the stomach and duodenum, respectively.

Semi Dynamic Digestion Assay:

2. The "stomach fluid" is prepared to mimic adult gastroduodenal digestion of 30 gr samples and 6 gr Glucose. Gastric digestion is performed by incubation for 2 hours (G120).

3. 50 ml of the resulting stomach digesta (G120) is incubated for 2 hours in duodenal digestion mixture (mimicking duodenal digestion).

4. Samples are collected at two time points: at the end of the stomach digestion stage (G120) and the duodenal digestion (D120).

5. Analysis time points and measurements:

G0 (beginning of the experiment): weight of entire sample (30 gr), weight of 100 particles, obtain pictures on millimetric paper.

G120 (after the stomach): weight of the entire sample, weight of 100 particles, picture on millimetric paper.

D120 after the duodenal digestion): weight of the entire sample, weight of 100 capsules, picture on millimetric paper.

Each sample was tested in three independent replicates, as detailed in Table 4:

TABLE 4

Tested samples (name and description):

| Sample name | Sample description |
|---|---|
| A + A | Particles of Agar 0.5% and Alginate0.5% in a ratio of 1:1 |
| AG | Agar pieces (particles) 0.5% |
| AL | Alginate capsules (particles) 0.5% |

Each sample was prepared according to the concentrations listed in Table 3 and using the protocols described above for each sample.

Table 5 below lists the total weight and the weight of 100 particles as measured at each time point. The AG (Agar) sample was not tested for 100 capsule weight, because agar in 0.5% is very soft and therefore impossible to capsule or even sliced into symmetric slices.

TABLE 5

Total weight of samples and of 100 Particles (capsules) at various time points

| Sample | G0 Total weight [gr] | G0 100 capsule weight [gr] | G120 Total weight [gr] | G120 100 capsule weight [gr] | D120 Total weight [gr] | D120 100 capsule weight [gr] |
|---|---|---|---|---|---|---|
| AL | 30 | 4.22 | 10.97 | 1.42 | 8.99 | 2.84 |
| AL | 30 | 3.33 | 11.49 | 1.22 | 8.49 | 1.56 |
| AL | 30 | 3.1 | 13.61 | 1.58 | 9.89 | 2.35 |
| AG | 30 | — | 28.41 | — | 9.43 | — |
| AG | 30 | — | 24.12 | — | 7.28 | — |
| AG | 30 | — | 29.76 | — | 14.68 | — |
| A + A | 30 | 5.16 | 17.19 | 3.06 | 11.4 | 4.13 |
| A + A | 30 | 6.31 | 16.65 | 3.19 | 11.5 | 3.94 |
| A + A | 30 | 6.16 | 17.33 | 3.07 | 10.23 | 3.23 |

Figure 3:
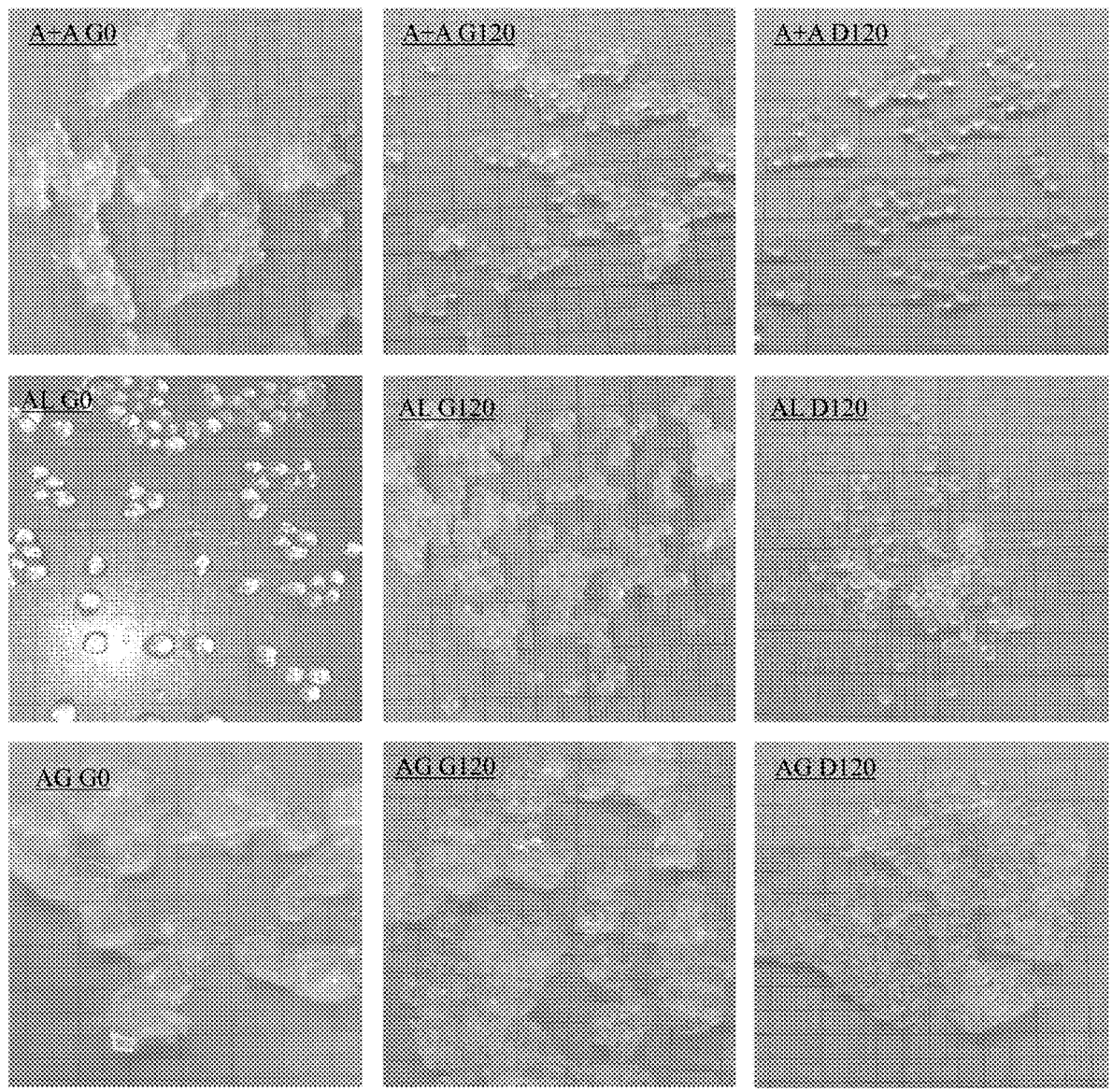
FIG. 3: images of various particles tested in an in-vitro digestion system, mimicking the conditions in the stomach and stomach and duodenum, according to some embodiment. Agar ("AG", comprising about 0.5% Agar), Alginate particles ("AL", comprising about 0.5 Alginate) and Agar-Alginate particles ("A+A", comprising Agar 0.5% with Alginate 0.5% at about 1:1 ratio) were incubated in the in-vitro digestion system. Samples of particles were taken prior to incubation (G0) and at the end of the gastric (G120) and duodenal (D120) phases and visualized.
Figure 4:
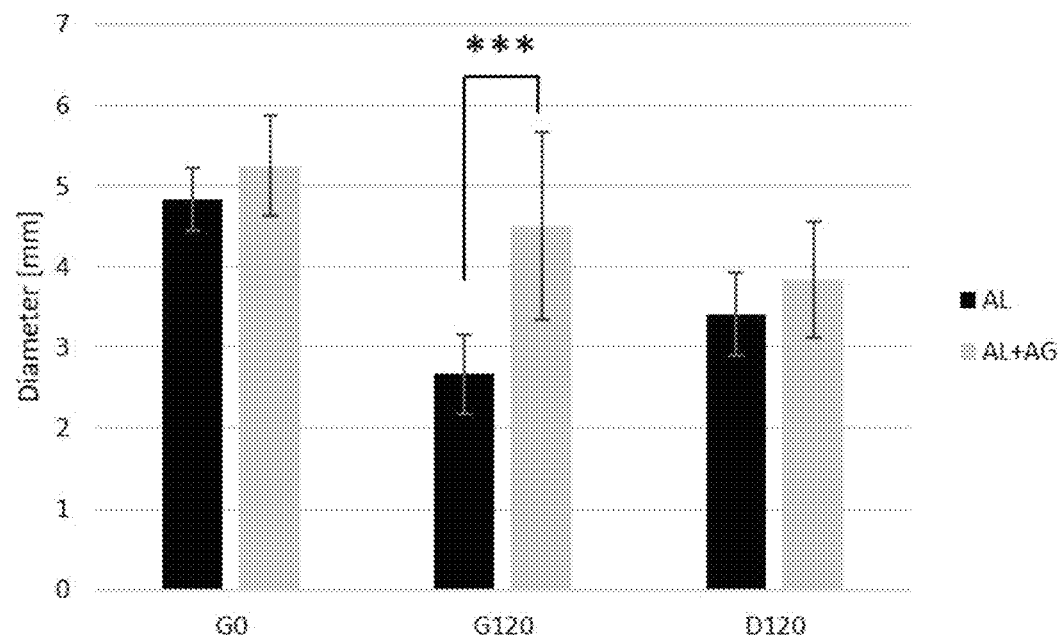
FIG. 4: Bar graphs showing the average diameter of particles samples incubated in the in-vitro digestion system, according to some embodiments. Alginate particles ("AL", comprising about 0.5 Alginate) and Agar-Alginate particles ("A+A", comprising Agar 0.5% with Alginate 0.5% at about 1:1 ratio) were incubated in the in-vitro digestion system. Samples of particles were taken prior to incubation (G0) and at the end of the gastric (G120) and duodenal (D120) phases and their diameter (mm) was determined. (n=12). T test ***$p<0.001$.

The results presented in FIG. 3 show images of samples before digestion (G0) and at the end of the gastric (G120) and duodenal (D120) phases. As clearly can be seen in in the images in FIG. 3, Particles of Agar+Alginate ("A+A") are bigger from AL at G0, and D120 and significantly bigger at G120. The results are quantified and presented in FIG. 4, which presents the average diameter of Agar+Alginate (A+A) particles and that of Alginate (AL), at each stage of the experiment. The results show that the A+A particles are larger on all stages, and are significantly larger in stage G120, after the stomach digestion, implying that the A+A capsules are bigger in the stomach and on the entrance to the intestine. It is to note that Agar 0.5% is very soft and therefore impossible to capsule, particulate or sliced into symmetric slices, as can be seen in FIG. 3 ("AG").

The results thus suggest that this difference in size of A+A particles can attribute to and benefit the sense of satiety, as reported by consumers (Example 3).

Figure 5:
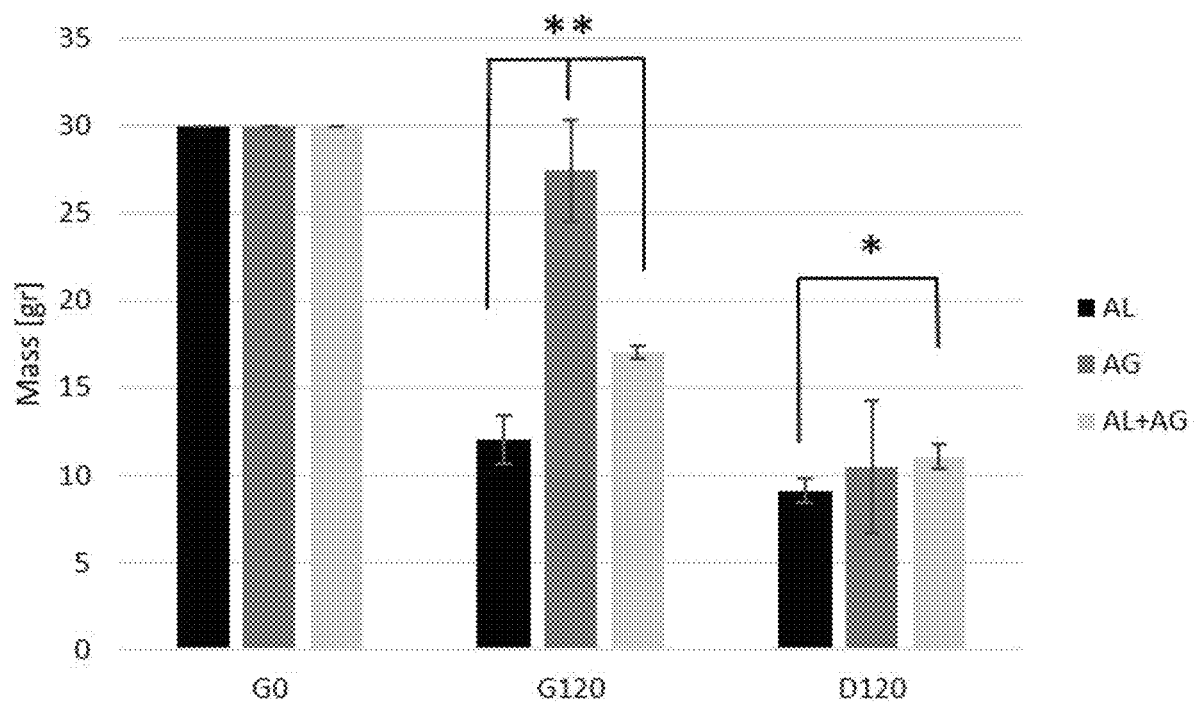
FIG. 5: Bar graphs showing the total weight (gr) of samples incubated in the in-vitro digestion system, according to some embodiments. Agar ("AG", comprising about 0.5% Agar), Alginate particles ("AL", comprising about 0.5 Alginate) and Agar-Alginate particles ("A+A", comprising Agar 0.5% with Alginate 0.5% at about 1:1 ratio) were incubated in the in-vitro digestion system. Samples were taken prior to incubation (G0) and at the end of the gastric (G120) and duodenal (D120) phases and the total weight (gr) was determined. *$p<0.05$, **$p<0.01$.

Further, the results presented in FIG. 5 show the analysis of samples total weights at each time point, according to the data presented in Table 5. It is to note that the weight of the samples also represents the size of the samples since most of the weight of the sample is water.

In order to promote satiety, the capsules need to occupy the GI tract. In the stomach (G120) AG (agar) weight was the highest, average of 27 grams, confirming the efficient stability of agar in the stomach at low pH. The A+A (also referred to as "AL+AG") particles exhibited significant stomach stability (weight) with average of 17 grams, as compared to Alginate particles, having as average of 12 grams. After the duodenal digestion (D120) the AL+AG particles were the heaviest and significant (p value of below 0.1 compared to AL particles alone).

The results presented herein demonstrate the advantage of the AL+AG particle which comprise middle stomach resistance (between AG particles and AL particles), and better performance in the duodenal digestion. AG has exhibited decent results; however, such Agar particles are hard to consume (from at least taste and structure aspects). Samples of the AG beads/particles aspirated from the three time points of each digestion test were soft, did not have a uniform shape and were mashed easily, so they were weighed only for total mass weight.

AL+AG sample was found to maintain their weight significantly better than Alginate (AL) particles (p<0.001). Another advantage of the AL+AG particles is their thermal stability characteristics which enable sterilization and better shelf life of the product, as further exemplified herein below.

Figure 6:
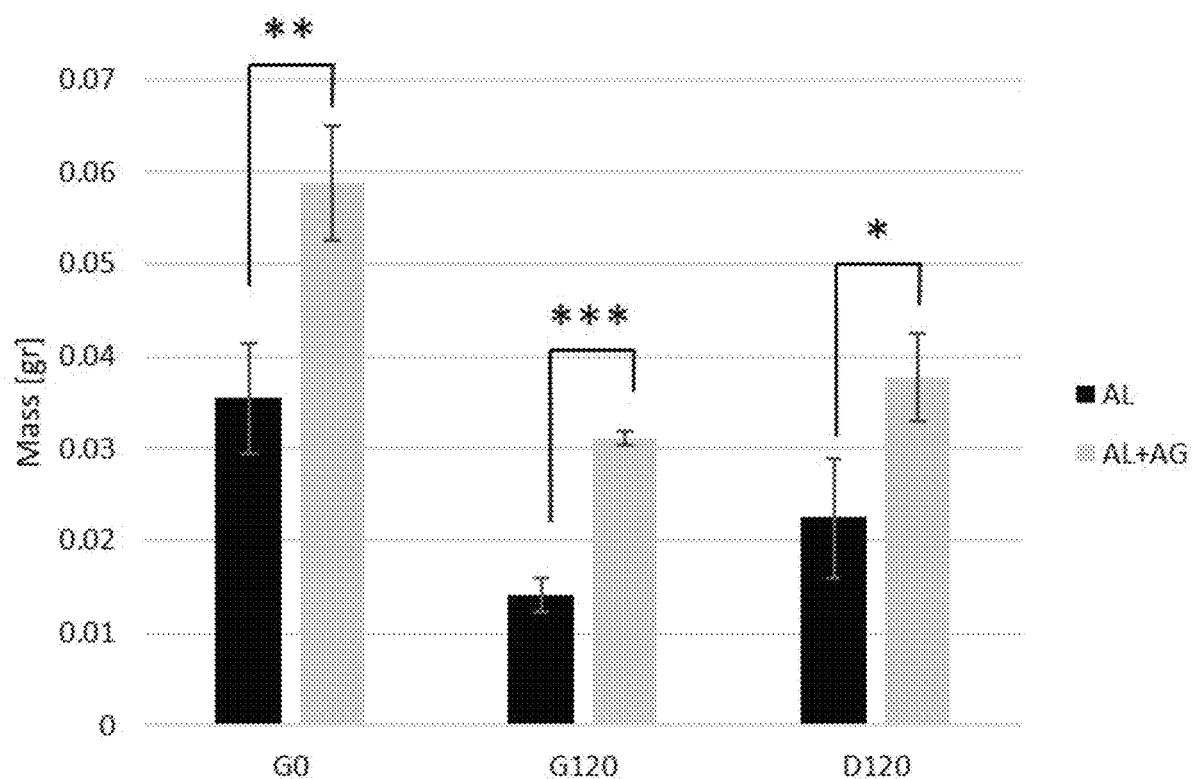
FIG. 6: Bar graphs showing the average weight (gr) of single particles, based on calculation of 100 capsules weight samples, according to some embodiments. Alginate particles ("AL", comprising about 0.5 Alginate) and Agar-Alginate particles ("A+A", comprising Agar 0.5% with Alginate 0.5% at about 1:1 ratio) were incubated in the in-vitro digestion system. Samples were taken prior to incubation (G0) and at the end of the gastric (G120) and duodenal (D120) phases and the average weight (gr) of single particles was determined. (n=300). *$p<0.05$, $p<0.01$, *$p<0.001$.

The results presented in FIG. 6 show the analysis of single particle weight calculated based on the weight of 100 particles. In some instances, to 100 particles, 1000 grain weight (the weight of 1000 grains or seeds) in cereals, is a common measurement that highly correlated with size of the grain. Analysis of 100 capsule weight (weight of single capsule (100 capsule/100)), support the differences and the advantages of the AL+AG particle as compared to AL particles alone. The particle size is different from the start at G0, meaning the AL+AG capsules are larger to start with, and the differences persist along the digestive system (G120 and D120). Together with the size advantages of AL+AG capsules in the GI system, such particles also taste better as compared to AL capsules, which have an after taste of iron (probably due to the Ca2+ polymerization).

Example 5: Thermal Stability of Tested Particles

In order to test the thermal stability of the tested particles, each sample A+A (Agar 0.5% with Alginate 0.5%, 1:1 ratio), AL (Alginate 0.5%) and AG (Agar 0.5%) particles were placed in a 50 ml tube. The tubes were incubated in hot bath for 1 hour at 3 different temperatures, 25° C., 50° C. or 100° C. After the incubation period, each sample was photographed.

Figure 7:
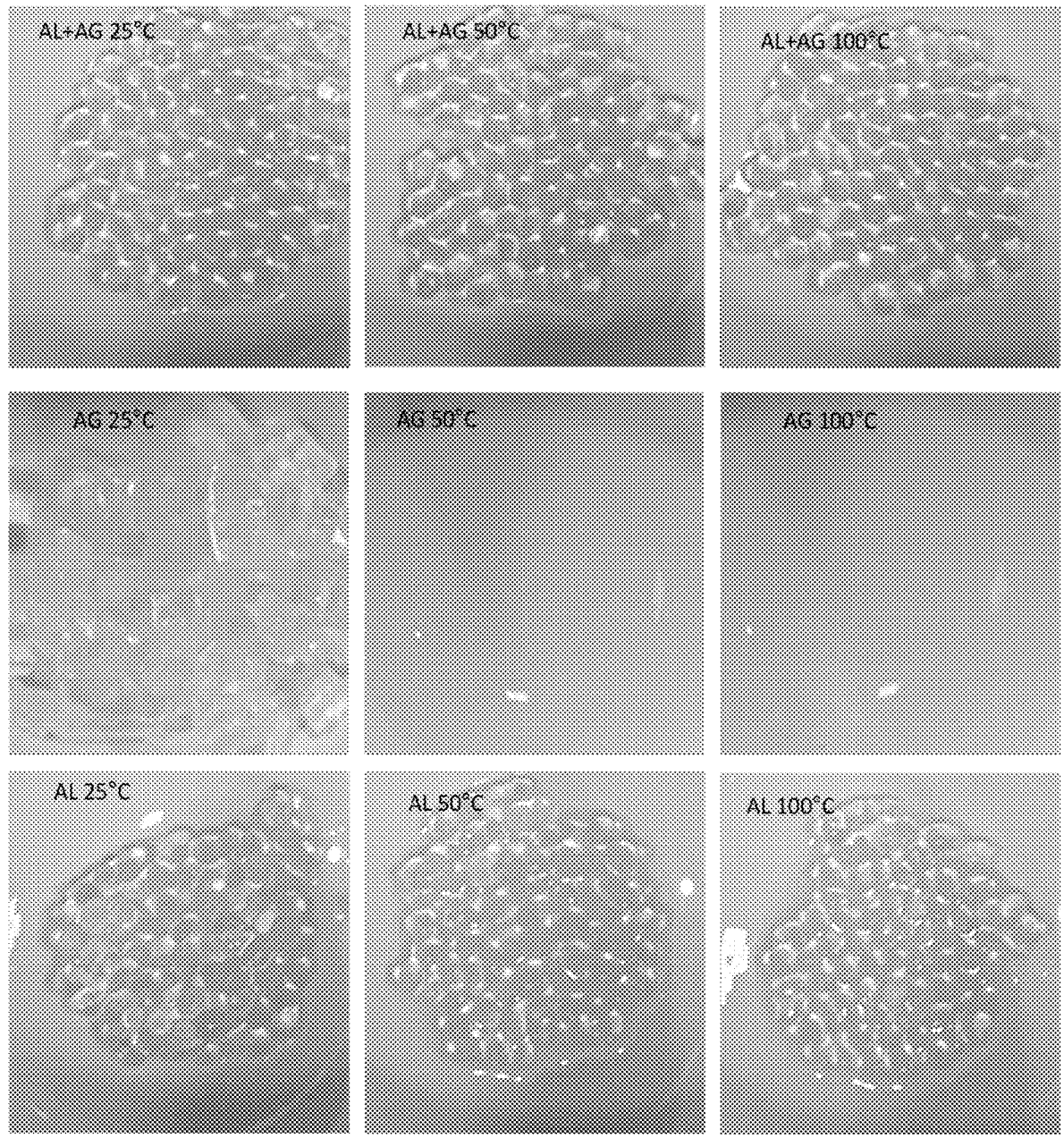
FIG. 7: images of various particles incubated for one hour at different temperatures, to test the thermal stability of the particles, according to some embodiments. Agar ("AG", comprising about 0.5% Agar), Alginate particles ("AL", comprising about 0.5 Alginate) and Agar-Alginate particles ("A+A", comprising Agar 0.5% with Alginate 0.5% at about 1:1 ratio) were incubated for 1 hour at 25° C., 50° C. or 100° C. Images of the particles were taken after one hour of incubation.

The results shown in FIG. 7 present images of the samples incubated in different temperatures for 1 hour (25° C., 50° C. or 100° C.). Clearly, as can be seen in FIG. 7, Agar+Alginate Particles (AL+AG) are thermally stable, as they maintain their structure and shape, meaning they did not melt in any of the temperature range tested, including boiling at 100° C. In contrast, the Agar (AG) sample melted at 50° C. and 100° C. Alginate particles (AL) also exhibit thermal stability characteristics to some extent.

The results demonstrate that advantageously, the Agar+Alginate particles are thermally stable and can be heated to 100° C. to sterilize. The thermal stability characteristic of such particles is advantageous, for example, by exhibiting extended shelf life of the product containing such particles.

Example 6: Mechanical Characteristics of Tested Particles

Each type of the particles that have been tested exhibit different chemical and physical characteristics. The mechanical characteristics of the particle are very important since the effect on satiety is controlled by the properties of the food consumed—energy, density and structure. Rupture testing (synonymous with puncture strength testing), is used to determine the puncture or rupture characteristics of a material. This is a compressive test, when a material is compressed by a probe or other type of device until the material ruptures or until an elongation limit is achieved. Rupture testing is commonly used to determine the strength of a material such as film, rubber or membrane. It is also often used in the food processing industry to determine the texture or ripeness of a product. Since the capsule gel are spherical the rapture test is good method to measure the mechanical strength.

To this aim, a rupture test has been performed on the various particles. Each capsule sample was measured for rapture test using Digital force gauge EFG series (ENPI) (Shenzhen Polygon Instrument Limited). The "rapture test" measuring the force until material is rupture by pressing on the capsule. A typical plot is of force load (N) vs. time (s) as the test progresses. The highest force value on the graph is described as the maximum strength (peak load) before rupturing. Harder samples will give a higher peak load.

Figure 8A:
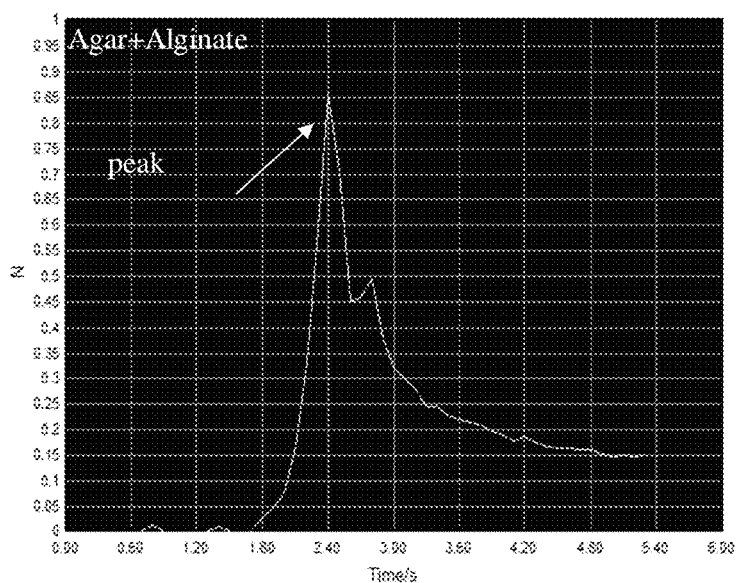
FIG. 8A-C: show curve graphs of rupture test of various particles, according to some embodiments.
Figure 8B:
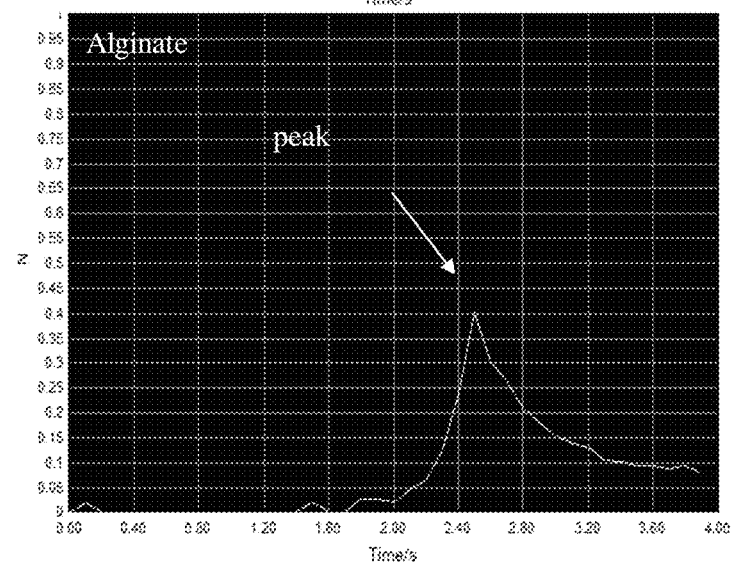
Figure 8C:
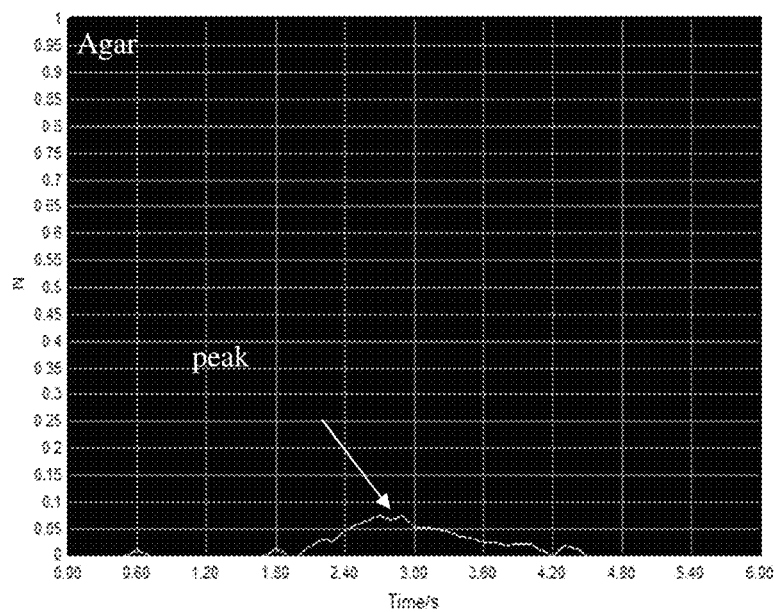

The results are presented in FIGS. 8A-C, which show examples of typical rapture curves for each tested sample. The results show the peak force under which the particles rupture. As can be seen in FIGS. 8A-C, a significant force ("peak") is required the rupture the Agar+Alginate particles (FIG. 8A), as compared to the force required to rupture the Alginate particles (FIG. 8B) or Agar particles (FIG. 8C). FIGS. 8A-C show examples of "rapture test" curves. Each test on single capsule was repeated 10 times, the results are the mean of the force at the rapture point.

Figure 9:
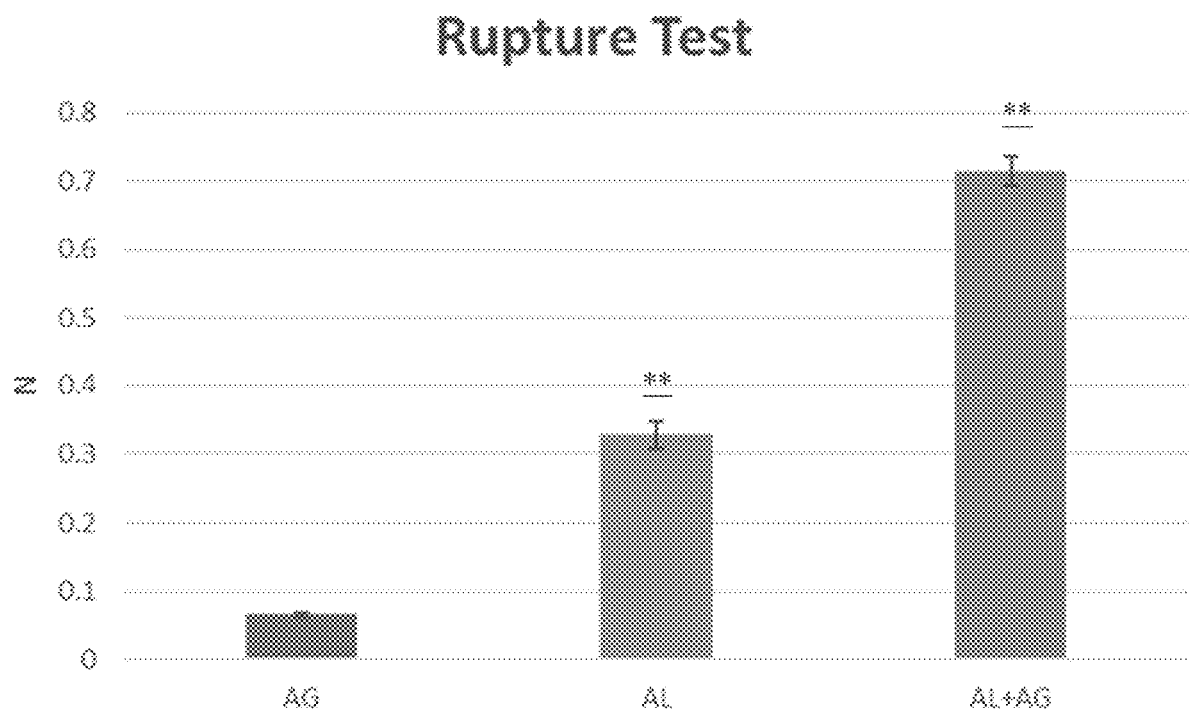
FIG. 9: Bar graphs showing average peak force (N) of rupture test of various particles, according to some embodiments. The average peak of the rupture test of the particles (i.e. the force (N) in which the particles rupture) was determined using a Digital force gauge EFG series (ENPI). Agar particles ("AG"), Alginate particles ("AL) and Agar+Alginate particles ("AL+AG"), having a diameter of about 4 mm were tested. Each bar is an average of 10 independent repeats (n=10). *$p<0.05$, **$p<0.01$.

Further, the results presented in FIG. 9, show the peak force upon which the tested particles are ruptured, using Digital force gauge EFG series (ENPI). Each bar in FIG. 9 is an average of 10 independent repeats. The particles tested have a similar dimeter of about 4 mm. As clearly shown in the results presented in FIGS. 8A-C and FIG. 9, the A+A particles (average peak force of 0.7141N±0.02) were significantly harder to rupture (by at least two-fold), as compared to AL (average peak force of 0.3286N±0.02) or AG average peak force of 0.065N±0.0035) particles.

Thus, the results presented herein clearly substantiate the physical advantages of the Agar+Alginate particles, in particular with respect of size, shape and stability.

Example 7: Sugar Absorption Capabilities by the Particles

The various particles were tested for their ability to absorb sugar from a high sugar liquid solution, to mimic the environment in the stomach and intestine. The experiment is aimed to show absorption of sugars by Agar particles, Alginate particles or Agar+Alginate particles at pH 2 (similar to the stomach environment) and at pH 7 (similar to the intestine environment). The particles were prepared as described above (Example 1). Each type of particles were added to a glucose solution (30% by weight) in pH 2 and in pH level 7 and soaked (incubated) within the glucose solution for 1.5 hours. From each of the test solutions, samples were taken every 15 minutes and evaluation of Glucose (sugar) concentration was performed using "digital sugar refractometer (Brix)" MA887 (Milwaukee instruments).

Figure 10:
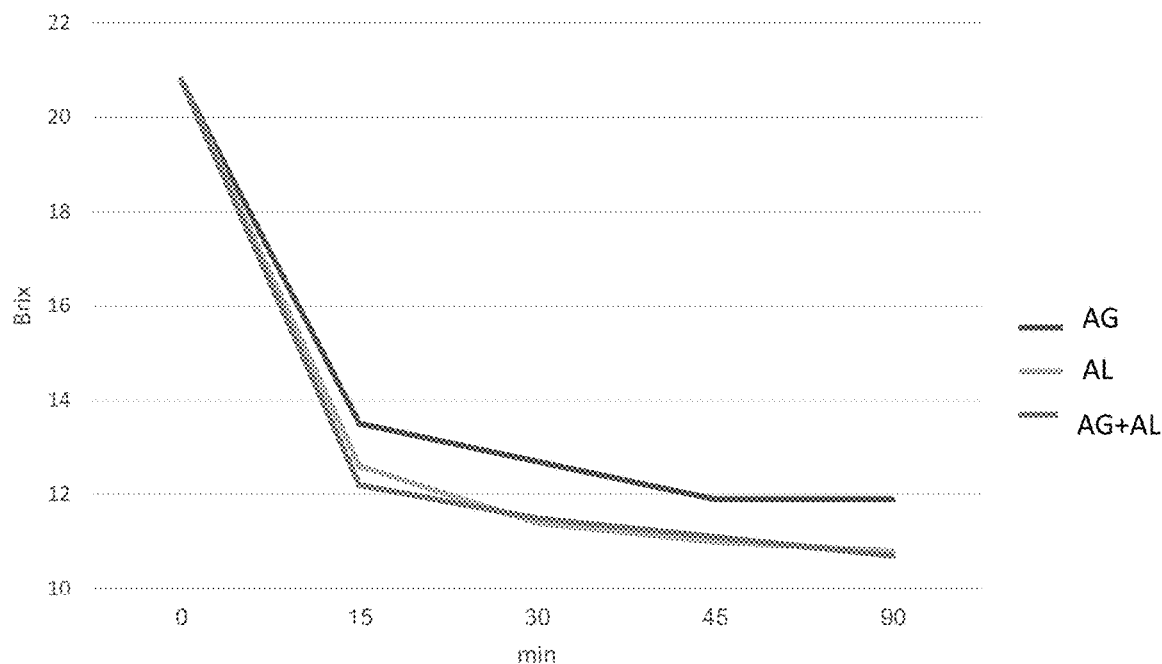
FIG. 10: line graphs of the absorption of glucose (Brix) by various capsules (Agar (AG), Alginate (AL) and Agar+Alginate particles (AG+AL)), after incubation at pH 2, over 90 minutes.

The results presented in FIG. 10 show the absorption of glucose by the particles when incubated at pH 2. As can be seen, the particles can absorb about 50% of glucose from the solution within 90 minutes, similar to the environment in the stomach pH 2.

Figure 11:
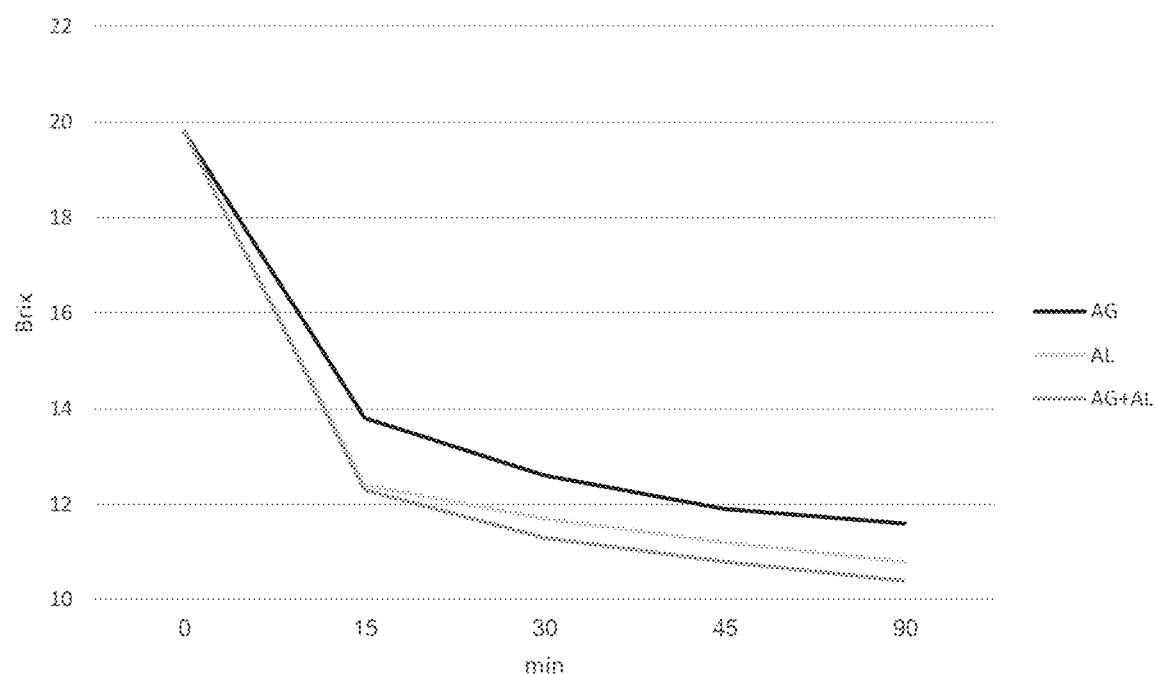
FIG. 11: line graphs of the absorption of glucose (Brix) by various capsules (Agar (AG), Alginate (AL) and Agar+Alginate particles (AG+AL)), after incubation at pH 7, over 90 minutes.

The results presented in FIG. 11 show the absorption of glucose by the particles when incubated at pH 7. As can be seen, the particles can absorb about 50% of glucose from the solution within 90 minutes, similar to the environment in the intestine, wherein the AL+AG particles exhibited the best absorption (i.e. reduction in glucose in solution).

Example 8: Food Products with Particles—Testing Satiety Feeling in Humans in Sensory Experiments A sensory test is performed to examine the satiety filling of subjects which consume a food product with the capsules. 100 adults (50 men and 50 women) participate in the study. Medium and above socioeconomic status. Participants are self-defined as do not distaste food products containing pieces of food and are able to swallow pills.

Stage 1—CPT (concept product test) research for conceptual and sensory evaluation. The research is conducted using personal interviews (one on one), among the target participants. The participants are gradually exposed to Agar+Alginate capsules in a food (yogurt, smoothies, vegetable and/or fruit purees etc.). At the tasting stage, each participant receives one serving (150-300 ml of the food product which includes about 50% capsules of total volume or weight of the product.

Stage 2—HUT (Home Usage Test) research: After stage 1, the participants are asked if they will be willing to take 3 additional serving for a 24 hours trial. During this phase and in order to trace the individual consumption habit of the product, each participant receives a link every 12 hours in order to learn if he/she had consumed the serving.

Thereafter, the participant receives a self-compliance questionnaire for each serving consumed, designed to understand the participant's impression of the product, his/her sense of satiety, eating habits throughout the day, the amount of the serving in practice and the feeling while consuming the product.

REFERENCES

1. A. Tamargo et al. Physical effects of dietary fibre on simulated luminal flow, studied by in vitro dynamic gastrointestinal digestion and fermentation. Food Funct., 2019, 10, 3452.
2. H. Maeda et al. Effects of agar (kanten) diet on obese patients with impaired glucose tolerance and type 2 diabetes. Diabetes, Obesity and Metabolism, 7, 2005, 40-46.
3. Georg Jensen M. et al. Effect of alginate supplementation on weight loss in obese subjects completing a 12-wk energy-restricted diet: a randomized controlled trial. Am J Clin Nutr. 2012 July; 96(1):5-13.
4. Ae-Jin Choi et al. Digestion characteristics and kinetic analysis of biomolecules in a simulated human intestinal system. 2015; Integr Food Nutr Metab, 2(3), 189-192.
5. Lee K Y, Mooney D J. Alginate: Properties and biomedical applications. Prog Polym Sci. 2012; 37(1):106-126.
6. Tehmina Amin and Julian Mercer. Hunger and Satiety Mechanisms and Their Potential Exploitation in the Regulation of Food Intake. Curr Obes Rep. 2016; 5: 106-112.
7. Barbara J Rolls at al. Volume of food consumed affects satiety in men. Am J Clin Nutr 1998; 67:1170-77.
8. Brodkorb et al. INFOGEST static in vitro simulation of GI food digestion, Nature protocols 2019.
9. Shani Levi et al. Comparative performance of milk proteins and their emulsions under dynamic in vitro adult and infant gastric digestion, Food Hydrocolloids 2013.

What is claimed is:
1. A satiety inducing food product comprising:
gel particles comprising Agar and Alginate; and
an aqueous solution or mixture;

wherein:
the gel particles are at a concentration of 10%-70% by weight in the food product;
the gel particles are homogenous in composition and dispersion and comprise about 0.5% Agar and about 0.5% Alginate by weight;
the gel particles have a peak force of at least 0.6N in a rupture test; and
the gel particles are formulated to remain intact in the stomach and in the intestine, so as to occupy volume within the stomach and the intestine to thereby induce satiety.

2. The food product according to claim 1, wherein the gel particles have a size range of about 2-8 mm.

3. The food product according to claim 1, wherein the gel particles comprise one or more additional additives, wherein the one or more additional additives comprises: L-carnitine, a vitamin, a protein, a flavoring material, a coloring material, or any combination thereof.

4. The food product according to claim 1, wherein the gel particles are spherical.

5. The food product according to claim 1, wherein a population of gel particles in the food product is similar with respect of shape, size and/or composition.

6. The food product according to claim 1, wherein the gel particles are stable at 100° C. for at least one hour.

7. The food product according to claim 1, wherein the food product is selected from a beverage, a running dairy product, yogurt, pudding, puree of vegetable(s) and/or fruit(s), a smoothie and porridge.

8. The food product according to claim 7, wherein the beverage further comprises one or more of: flavoring agents, colorants, gas, or any combination thereof.

9. The food product according to claim 1, wherein the gel particles are further formulated to absorb sugars in the stomach and/or intestine and wherein the gel particles are further formulated to be excreted together with the absorbed sugars via the feces, thereby reducing sugar content in the gastrointestinal (GI) tract.

10. A method of inducing satiety, reducing appetite and/or reducing blood sugar levels, the method comprising administering to a subject the food product according to claim 1.

11. A method of manufacturing a food product that induces satiety, the method comprising:
preparing gel particles of Agar and Alginate by the steps of:
dissolving Agar in water to produce a solution having a concentration of ~0.5% by weight Agar and heating said solution to a temperature of 70° C.-100° C. until the Agar is dissolved;
dissolving Alginate powder in water to produce a solution having a concentration of 0.5% by weight Alginate;
mixing the Agar solution and the Alginate solution to produce a homogenous mixed solution;
cooling the mixed solution to a temperature of 30° C.-70° C.;
dripping the mixed homogeneous Agar-Alginate solution into an aqueous solution comprising a Calcium salt to obtain spherical gel particles; and
mixing 10%-70% by weight of said gel particles in an aqueous solution or mixture to obtain the food product,
wherein the gel particles have a peak force of at least 0.6N in a rupture test.

12. The method according to claim 11, further comprising introducing one or more additives to the mixed homogeneous Agar-Alginate solution.

13. The method according to claim 11, wherein the Calcium salt is selected from: calcium lactate, calcium acetate, calcium carbonate, Calcium chloride, Calcium citrate, and/or Calcium gluconate, at a concentration of about 0.5-3.5% by weight of the aqueous solution.

14. The method according to claim 11, wherein the aqueous Calcium-salt solution is at a temperature of about 4-70° C.

15. The food product according to claim 1, wherein the gel particles have a peak force of at least 0.7N in a rupture test.

16. The food product according to claim 1, wherein the gel particles are stable at a temperature of at least 80° C. for at least 30 minutes.

17. The food product according to claim 1, wherein the gel particles are stable at a temperature of at least 100° C. for at least 30 minutes.

* * * * *